US008824822B2

(12) United States Patent
Lei et al.

(10) Patent No.: US 8,824,822 B2
(45) Date of Patent: Sep. 2, 2014

(54) METHODS AND APPARATUS FOR IDENTIFYING PUNCH HOLES IN IMAGES

(75) Inventors: Yuanyuan Lei, Tampa, FL (US); William Douglas Withers, Arnold, MD (US)

(73) Assignee: Accusoft Corporation, Tampa, FL (US)

( * ) Notice: Subject to any disclaimer, the term of this patent is extended or adjusted under 35 U.S.C. 154(b) by 172 days.

(21) Appl. No.: 13/410,467

(22) Filed: Mar. 2, 2012

(65) Prior Publication Data

US 2013/0229695 A1 Sep. 5, 2013

(51) Int. Cl.
*G06K 9/40* (2006.01)
(52) U.S. Cl.
USPC .......................................... 382/254
(58) Field of Classification Search
USPC ............................ D19/13; 382/204, 254, 275
See application file for complete search history.

(56) References Cited

U.S. PATENT DOCUMENTS 8,164,796 B2 * 4/2012 Wilsher et al. ............... 358/3.26
2008/0279474 A1 * 11/2008 Venable et al. ............... 382/275

* cited by examiner

*Primary Examiner* — Gregory F Cunningham
(74) *Attorney, Agent, or Firm* — Straub & Pokotylo; Michael P. Straub; Stephen T. Straub

(57) ABSTRACT

Methods and apparatus for detecting the presence and location of punch holes in a scanned image are described. The punch hole detection methods and apparatus rely at least in some embodiments on whether a portion of the scanned image, referred to as a component, corresponds to a punch hole by comparing one or more characteristics of the component such as its circularity, aspect ratio, black to white pixel ratio, density, height and/or width to one or more thresholds before making a decision as to whether or not the component is a punch hole. In some embodiments the components which pass component-level checks are grouped and one or more group-level checks are performed on the components to determine if the components are punch holes. Once a punch hole is detected, in some embodiments, the image is processed to remove the detected punch hole.

20 Claims, 27 Drawing Sheets

| FIGURE 25A | FIGURE 25B |

METHODS AND APPARATUS FOR IDENTIFYING PUNCH HOLES IN IMAGES

FIELD

The present application relates to image processing methods and apparatus and, more particularly, to methods and apparatus for detecting and/or removing punch holes from images, e.g., scanned images.

BACKGROUND

Paper documents are often hole-punched for purposes of facilitating storage in binders and/or folders. Punch holes, when created in paper, are usually round in shape with multiple holes normally being punched in a relatively straight line, e.g., appearing as a line of holes in a paper. Hole punching often is performed at the side or top of a page. In some cases, over time, a page may be punched multiple times, e.g., for storage in different binders and/or folders. Thus, in some documents multiple sets of holes corresponding to punch holes made to facilitate storage in a binder or folder may be found in a single document, e.g., sheet of paper.

For purposes of electronic storage, form processing, and/or for electronic document transmission, paper documents are often optically scanned and then processed. Scanning of documents often results in a set of binary, e.g., black or white, pixel values, representing the scanned image. In most cases where printed documents are scanned, the text will be black or interpreted as black with the background being white. For example, a black pixel value may be represented by a "1" pixel value and a white pixel value represented by a "0" pixel value.

As part of the scanning process one or more sheets of paper may be scanned. Unfortunately, as part of the scanning processes and/or as the result of previous copying or the original physical hole-punching performed to generate the document which is being scanned, the marks, corresponding to punch holes, which are shown in the scanned image may not appear as perfect circles. For example, physical punch holes which were originally round may appear, in the scanned image, as ovals due to skewing and/or non-uniform scaling in the horizontal and vertical dimensions during the scanning process and/or may not be perfectly round for other reasons, e.g., one or more holes were not punched through completely.

Punch holes will often appear as dark areas on a scanned image which has a white background such as when white paper with black text is scanned. Since the punch hole may have been incomplete or the scanning may not detect the hole as being all black, some portions of the area corresponding to a punch hole may appear white in the scanned image. It should be appreciated that scanned documents often include text. One problem that occurs when attempting to identify punch holes in some images is the problem of distinguishing between text characters having round or oval features and punch holes. For example, it should be appreciated that depending on the method being used to detect punch holes, it may be difficult to distinguish between a capital "O" and a mark on the scanned image resulting from the presence of a punch hole.

While a stack of papers may have holes punched in the same location, a set of pages scanned at the same time may include sheets that were hole-punched at different times, which were put in the scanner upside down, and or slightly mis-fed by the scanner resulting in punch holes appearing at different locations from one image, e.g., scanned page, to the next image, e.g., next scanned page. Thus, it should be appreciated that it is desirable to be able to identify punch holes without having to rely on the occurrence of holes in the same location in multiple scanned pages.

The detection, e.g., identification, of punch holes in a generally reliable manner is important if subsequent image processing is to occur which takes into consideration the presence of one or more punch holes.

In view of the above discussion, it should be appreciated that there is a need for method and apparatus for identifying punch holes in a scanned image and/or for performing image processing operations on an image based on information regarding detected punch holes in a scanned image.

SUMMARY

Methods and apparatus for detecting the presence and location of punch holes in a scanned image are described herein. Once detected, in some embodiments, the image is processed to remove all or a portion of one or more detected punch holes. The resulting enhanced image is stored and/or transmitted. The enhanced image may be, and in some embodiments is, subject to one or more optical character recognition processes with text information being generated and stored in a file, e.g., a text file, for later use by another application such as a word processing application or form presentation and/or generation application.

The punch-hole detection methods of the present invention rely, at least in some embodiments, on one or more characteristics which are expected of punch holes, e.g., holes, created as a result of a punch hole process and the expected image characteristics of such punch holes in a scanned image as well as expected distortions which may be introduced via scanning and copying operations.

For example, in determining whether a portion of a scanned image, referred to as a component or image component in the present application, corresponds to a punch hole, one or more features of the component are taken into consideration. The features of the image component which are considered alone or in combination include, in some embodiments one, multiple or all of the following: the circularity of the component, the aspect ratio of the component, the black to white pixel ratio of the component, the density of the image component, the height of the image component, and the width of the image component. Often, multiple characteristics of a component are considered and compared to various thresholds before making a decision whether or not an image component is a punch hole.

As should be appreciated, such component-level checks can be useful in distinguishing between image portions which correspond to various shapes, objects or text which have component-level features which are distinguishable from the features an individual component is expected to have if it corresponds to a punch hole.

In some embodiments, components which pass the component-level punch-hole checks are considered to be punch holes and identified as such. The identified punch holes are, in some embodiments, subject to punch-hole removal to generate an enhanced image which does not include the detected punch holes.

While component-level checking is used in some embodiments to determine if a component is a punch hole, in other embodiments components which pass the component-level checks are subjected to group-level checks before they are declared to be detected punch holes. Thus, in such embodiments, the group-level punch-hole checking adds a level of reliability which may not be possible if the punch-hole group-level checks are not performed prior to declaring detection of a punch hole.

Thus, in some but not necessarily all embodiments, in addition to subjecting an image component to various component-level checks relating to whether or not an image component is a punch hole, image components are subjected to one or more group-level checks. Group-level checks are implemented, in at least some embodiments, under the assumption that punch holes used for storing documents in binders and/or folders are normally made in groups of two or more holes and further that the characteristics of the image components corresponding to the same group of punch holes should be similar if they are, in fact, punch holes. Furthermore, in some embodiments, image components which are being considered as possible punch holes, of a group of punch holes, are checked to see if they come close to forming a line. This check takes into consideration that holes generated for document storage purposes are normally made in documents in a straight line. Similarity in terms of the shape and/or size of components in a possible group of punch holes is also taken into consideration. If an image component differs in terms of size and/or shape from other members of the group of components under consideration as a possible group of punch holes, by an amount which is considered significant, the individual component is rejected in some embodiments and is excluded from further consideration as a possible member of the potential punch-hole group.

In embodiments where individual component-level and group-level checks are made, components which fail one or more of the checks are excluded from consideration as a possible punch hole. Components which pass the implemented combination of checks are declared to be punch holes and subject to further image processing.

By using component-level and/or group-level checks on image components to determine if a component is a punch hole, a high degree of punch-hole detection reliability can be achieved in many applications.

Once punch holes are identified, in some embodiments information identifying the location and size of the punch holes is stored along with the scanned image to which the punch-hole information corresponds. In at least some embodiments the punch-hole identification information is used to facilitate enhancement of the scanned image. In at least one such embodiment the scanned image data and punch-hole identification information is supplied to an image enhancement module which processes the scanned image to remove identified punch holes and to generate an enhanced image therefrom. In simple implementations the enhancement module replaces pixel values in the scanned image corresponding to the foreground color, e.g., black, with background pixel values, e.g., white pixel values, thereby erasing the holes from the image. In more advanced embodiments, image reconstruction operations may be performed which restore portions of text letters and/or lines which were deleted or removed as a result of the hole-punching operation. Such enhanced operations can, and in some embodiments do, improve subsequent optical character recognition and text generation operations performed using the enhanced image generated in accordance with the present invention.

Enhanced images and/or text generated from processing an image in accordance with the present invention can be, and in some embodiments are, displayed on a display device. In other embodiments the enhanced images and/or text files generated in accordance with the invention are stored in a storage device and/or transmitted, e.g., to a computer system or other device where they are displayed or otherwise presented to a user, e.g., in visual form or, in the case of text, at least sometimes as audible words.

While various exemplary embodiments and features have been described, numerous additional features and embodiments are described in the detailed description which follows.

DETAILED DESCRIPTION

Figure 1:
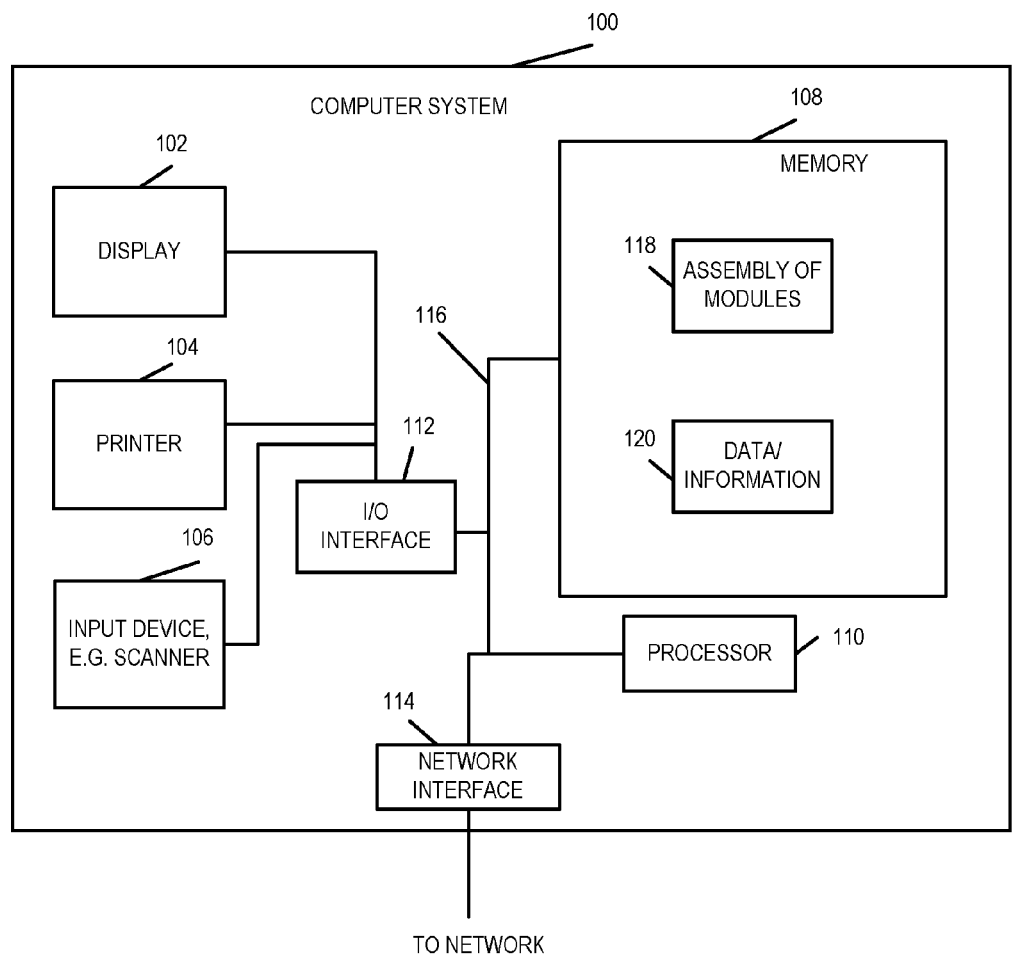
FIG. 1 illustrates an exemplary system for processing image data in accordance with one embodiment of the present invention.

FIG. 1 illustrates an exemplary system, e.g., computer system 100, for processing image data, e.g., a scanned and digitized page of a document in accordance with one embodiment of the invention. The image data being processed may be, and in various embodiments does, represent all or a portion of an image that includes punch holes which are to be identified and removed from the image as part of the image processing performed in accordance with the invention. The punch holes may be, e.g., the result of a page which was scanned to generate the image data included punch holes, e.g., used to facilitate storage of the page in a binder or folder.

The exemplary computer system 100 includes a display device 102, an output device, e.g., printer 104, an input device 106, e.g., scanner for scanning paper versions of documents, memory 108, a processor 110, a network interface 114, and an I/O interface 112. The display device 102 may be, and in some embodiments is, used to display images resulting from the punch-hole identification and removal image processing performed in accordance with the present invention while the printer may be used to print such images. Thus, the processed images, with detected punch holes removed are output in some embodiments in a viewable or physical form thereby allowing a user of the system to more easily view and read the content of the image than might be the case if it included punch holes present in the original scanned image.

The display device 102, printer 104, and input device 106 are coupled to a bus 116 by an I/O interface 112. The bus 116 is also coupled to the memory 108, processor 110 and network interface 114. The network interface 114 couples the internal components of the system 100 to an external network, e.g., the Internet thereby allowing the system 100 to receive images, e.g., with punch holes, and send image data, e.g., digitized pages or portions of pages with punch holes removed generated in accordance with the present invention, over a network.

The processor 110 controls operation of the computer system 100 under direction of software modules and/or routines stored in the memory 108. Memory 108 includes an assembly of modules 118 wherein one or more modules include one or more software routines, e.g., machine executable instructions, for implementing the image processing methods of the present invention. Individual steps and/or lines of code in the modules of 118 when executed by the processor 110 control the processor 110 to perform steps of the method of the invention. When executed by processor 110, the image processing modules 118 cause at least some image data to be processed by the processor 110 in accordance with the method of the present invention. The resulting data and information (e.g., image data, punch-hole data and/or statistics) are stored in data memory 120 for future use or additional processing or output, e.g., to display device 102 to be displayed or to printer 104 for printing.

Figure 20:
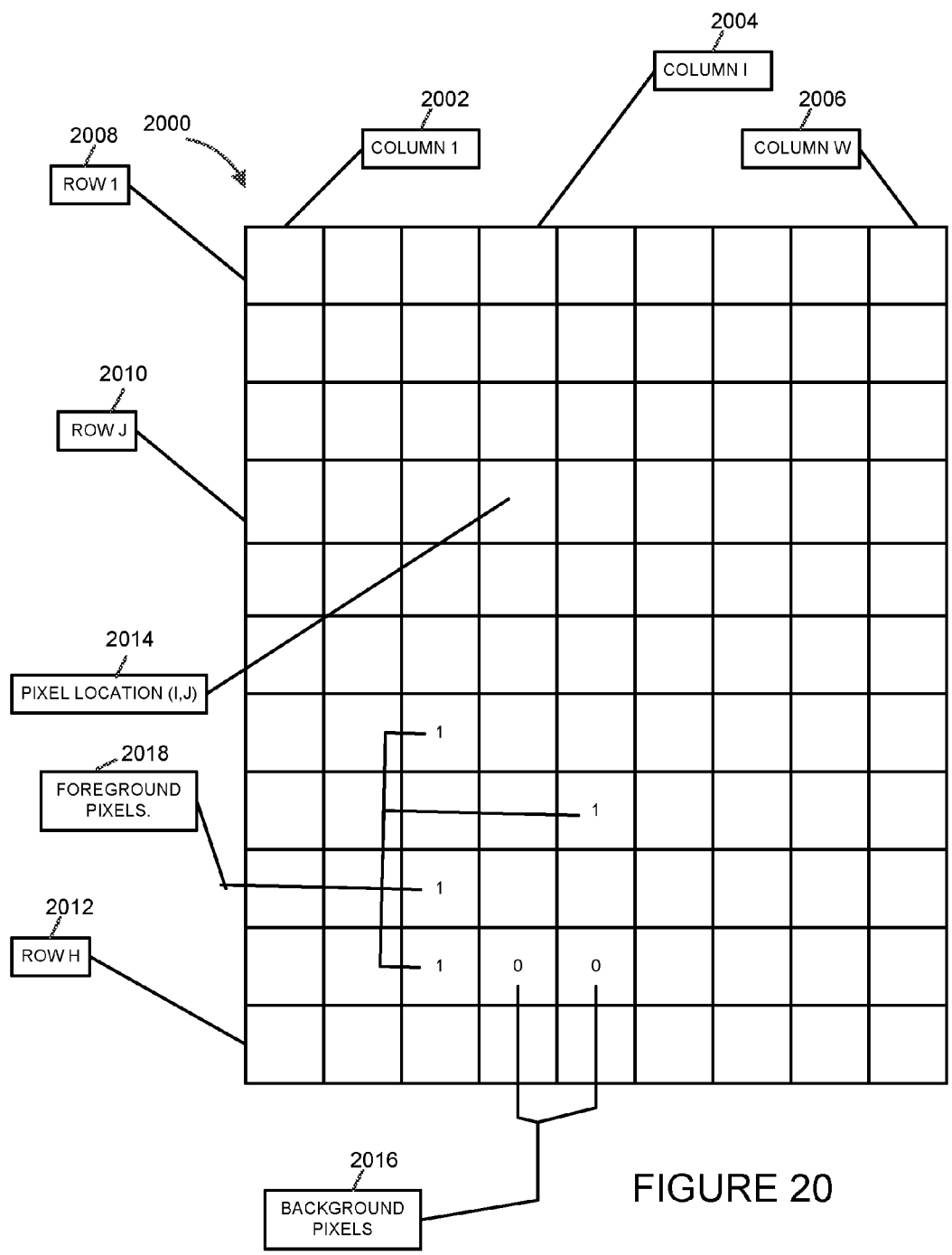
FIG. 20 illustrates the layout of a rectangular pixel array.
Figure 21:
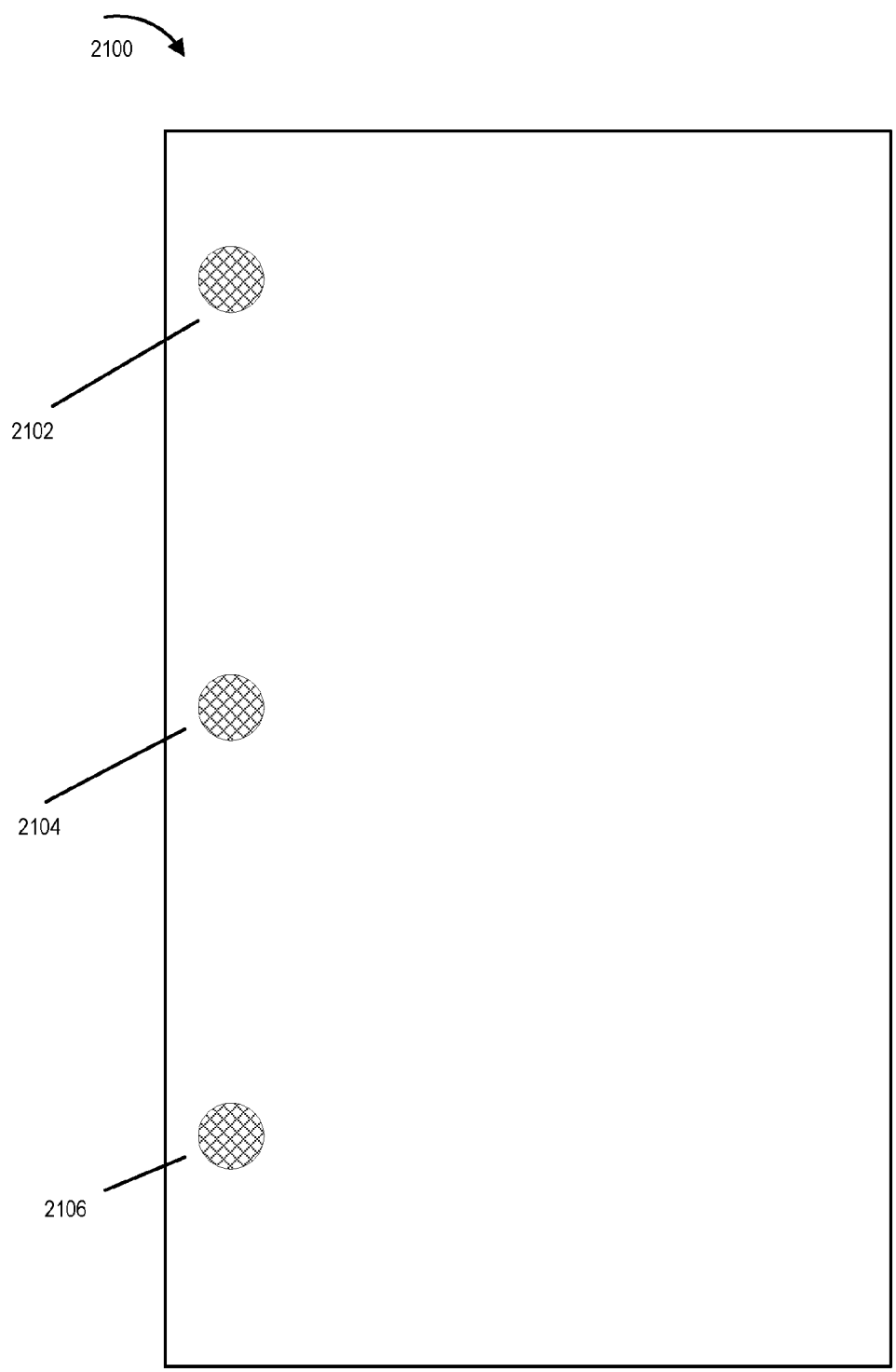
FIG. 21 illustrates an example of a page with punch holes which may be processed in accordance with the present invention.

The image processing method can be understood in the context of processing of an image corresponding to an exemplary page. Consider for example the image of an exemplary page 2100 shown in FIG. 21. Page 2100 may be a form with hole punches 2102, 2104 and 2106, depicted as cross-hatched filled circles, aligned on the left edge of the page. A cross-hatch pattern in the disclosed figures represents black. When a page is scanned, the result of the scanning process is a set of information representing the digitized image of the page. The set of information normally, but not always, corresponds to a rectangular array of pixel elements or pixels with the array being of dimensions W and H where the "width", W, is the number of pixels in each horizontal row of the array and the "height", H, is the number of pixels in each vertical column of the pixel array. The columns may be identified, for purposes of discussing such as a set of information, by an index, I, whose values can range from 1 to W; and the rows can be identified by an index J whose values range from 1 to H, where W, H, J and I are integer values. If a pixel array itself is labeled as P, then the value of a pixel in the column with index I and row with index J is labeled for discussion purposes as P(I,J). The ordered pair (I,J) is sometimes called the "address" or "pixel location" of this pixel. This is illustrated in FIG. 20. FIG. 20 includes an exemplary pixel array 2000 in which column 1 2002, exemplary column I 2004, column W 2006, row 1 2008, exemplary row J 2010, row H 2012, and exemplary pixel location (I,J) 2014 are identified.

While the particular colors that are used on a page, e.g., a form, can vary from application to application, many applications only have two distinguishing color features, the background color and the foreground color. It is common practice to set the values of all pixels representing the background color to the number 0, as illustrated with background pixels 2016 in FIG. 20, and all pixels representing the foreground color to the value 1, as illustrated with foreground pixels 2018 in FIG. 20. However, the use of 0 to represent background and 1 to represent foreground may vary from one application to another and thus the use of 0 for background and 1 for foreground is exemplary.

Figure 22:
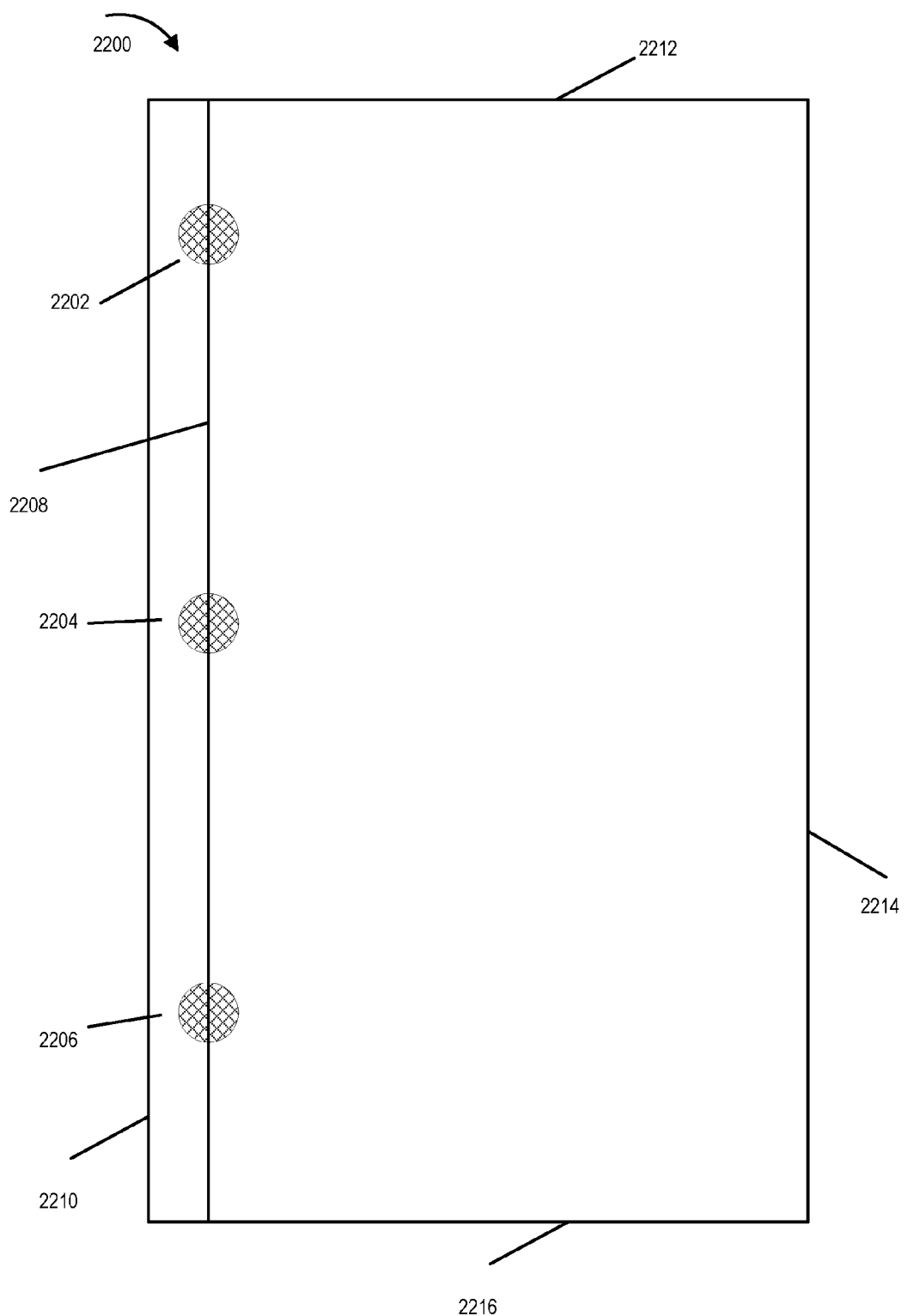
FIG. 22 illustrates an example of an ideal scanned image of a page with undistorted punch holes that may be processed in accordance with the present invention.

FIG. 22 shows an ideal undistorted image 2200 of an exemplary page with three ideal, e.g., perfectly circular, punch holes which has been scanned and digitized. The image forms a rectangle with four edges, a left edge 2210, a top edge 2212, a right edge 2214 and a bottom edge 2216. The punch holes 2202, 2204, and 2206 are shown as cross-hatched filled circles of an equal and uniform size on a white background. A line 2208 which is not part of the image has been depicted which shows that the punch-hole images 2202, 2204 and 2206 form a straight line with their circle centers an equal distance from the left edge of the image 2210. This pattern can be expected if the paper was punched perfectly for purposes of insertion into a three ring binder.

Figure 23:
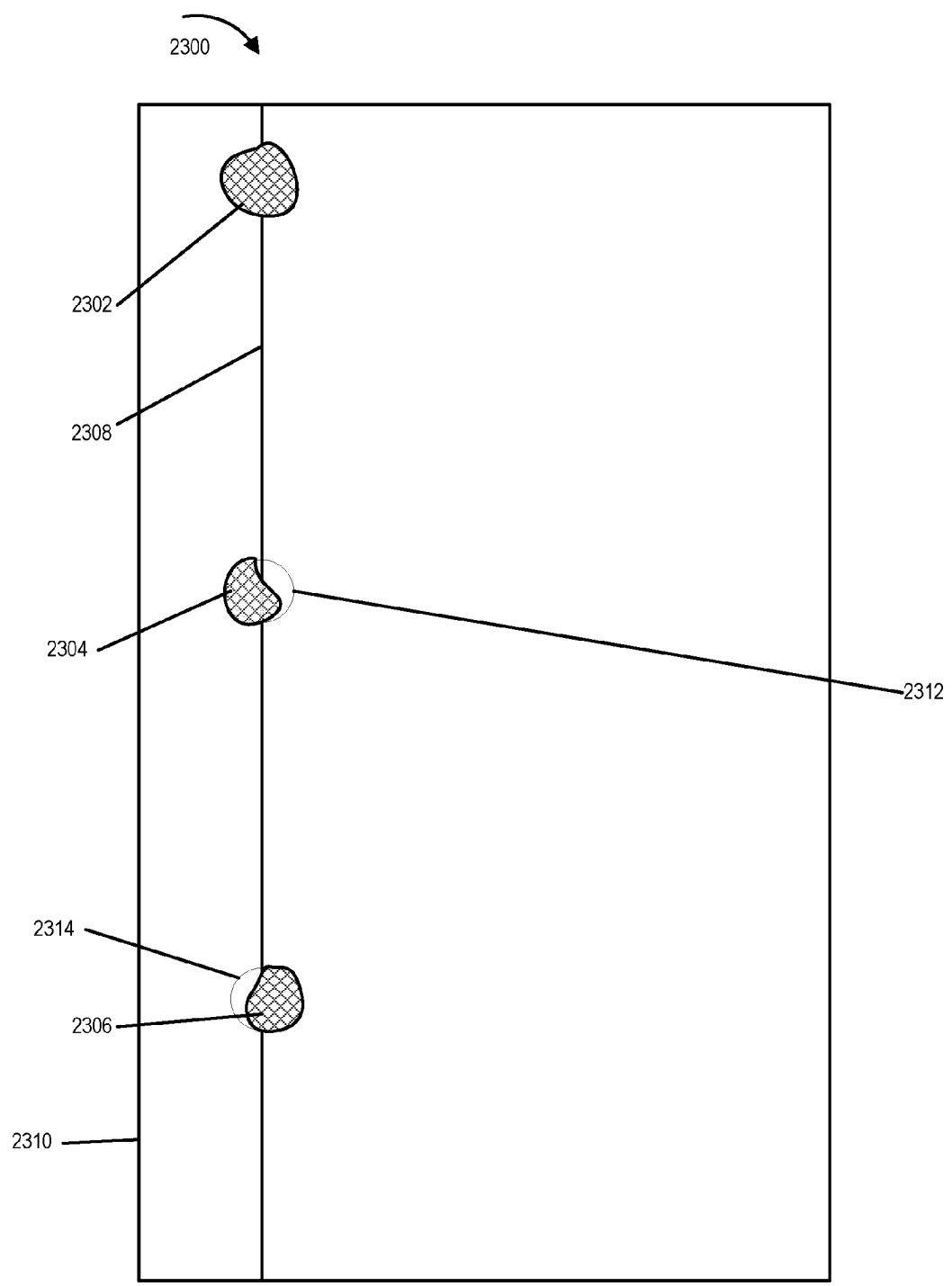
FIG. 23 illustrates an example of a scanned image of a page that may be processed in accordance with the present invention wherein the punch holes of the image are distorted.

Unfortunately, in real world applications the image shown in FIG. 22 is not likely to be encountered due to punch-hole irregularities and/or scanning errors. FIG. 23 depicts an image 2300 of a scanned page with three punch holes along the left side of the page. As shown in image 2300 the three punch holes, which would ideally be uniform circles an equidistant amount from the left edge of the page, are distorted due to punch-hole issues, scanning issues and/or distortion of the paper which forms the page. Punch holes 2304 and 2306 are shown superimposed over the ideal punch-hole circles 2312 and 2314 respectively shown only for illustrative purposes but which are not part of the image 2300 of FIG. 23. From FIG. 23 it is evident that the images of the punch holes are not uniform circles but may be thought of as distorted or incomplete circles. Additionally, line 2308 is not part of the image of the page but has been depicted for illustrative purposes. Line 2308 is a straight line passing through the center of the ideal punch-hole circles 2312 and 2314. A review of this line shows that the center of the punch-hole images 2302, 2304, and 2306 which are not uniform do not form a straight line and that the centers of the punch-hole images are not an equal distance from the left edge of the page's image 2310. For example, the center for the punch-hole image 2304 is to the left of line 2308 while the center for the punch hole image 2306 will be to the right of the line. This may be the result of the paper being inserted at a slight angle when placed in the device making the punch holes and/or due to other irregularities. While the punch-hole images 2302, 2304 and 2306 have been shown as cross-hatched filled shapes representing that all pixels in the shape are black in other examples not every pixel of the punch-hole image need be black. The shapes 2302, 2304 and 2306 shown in the FIG. 23 may, in connection with the description of the present invention, be referred to as components or image components that are analyzed to determine if they should be identified as punch holes on the image.

Figure 24:
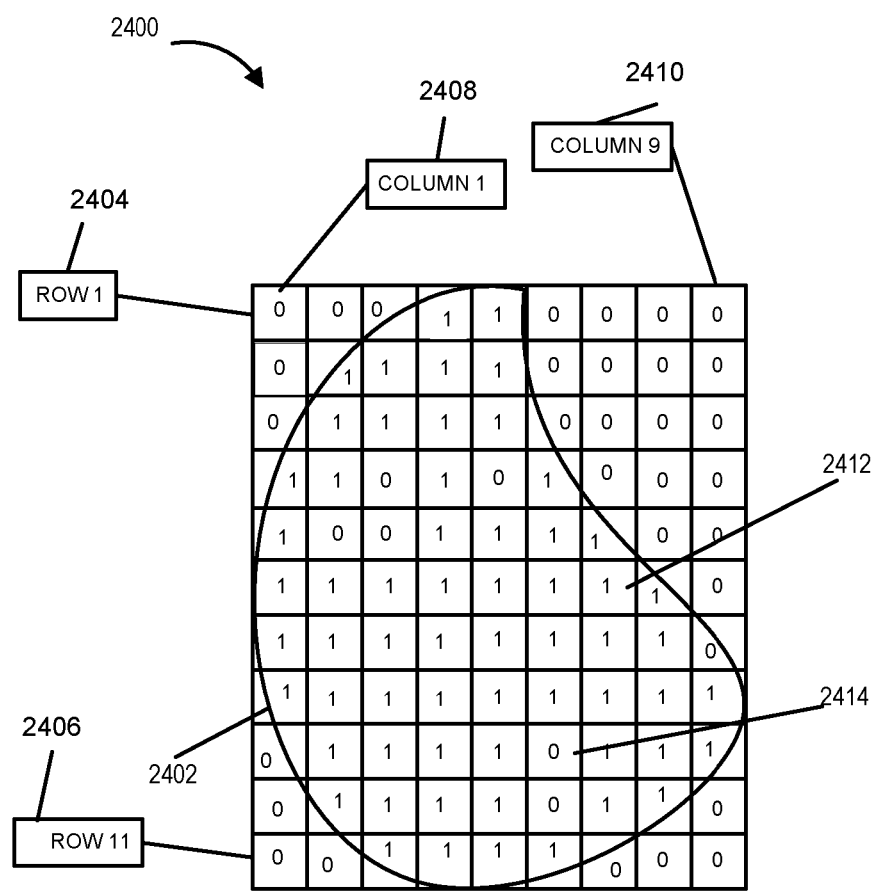
FIG. 24 illustrates an exemplary component of an image represented as a pixel array using binary image data that may be processed in accordance with the present invention.

In some embodiments of the present invention the components 2302, 2304 and 2306 would be associated as belonging to a group of components on the left edge of the image. FIG. 24 depicts how an exemplary component of an image may be represented as a pixel array using binary image data. Depicted in pixel array 2400 is a component 2402. Each pixel in the array 2400 contains a pixel value of "1" indicating the pixel is black or a "0" indicating the pixel is white. The line 2402 is not part of the pixel array but is an outline of the shape of the component being represented by the data in the pixel array. The line 2402 indicates those pixels which form the component. The component 2402 has a height of 11 pixels and a width of 9 pixels. Exemplary pixel (7,6) 2412 has a value of "1" indicating that it scanned as a black pixel and exemplary pixel (6,9) 2414 has a value of "0" indicating that it scanned as a white pixel.

An exemplary method of performing the punch-hole image identification and removal process which can be and in some embodiments of the present invention is used will now be discussed in connection with reference to FIG. 2. The method of exemplary routine 200 starts at start step 202 with the routine 200 being executed by the processor 110. At this point, the image data to be analyzed for identification and removal of punch holes has already been digitized through scanning or other methods. From start step 202, operation proceeds to step 204. In step 204, the image data 210, e.g., binary image data, corresponding to the image or image component in which punch holes are to be identified for removal or for other image processing operations, begins being processed. While binary image data is processed in the exemplary embodiment, the methods and apparatus of the invention can be used with other types of image data as well, e.g., with gray scale and/or color images. In the case of binary image data, individual pixels are normally represented using one of two values corresponding to either a pixel being black or being white. Given the binary nature of such image data, it is well suited for forms and/or text documents and thus will be used for explaining at least some exemplary embodiments of the invention. The image data may include one pixel value for each pixel of the represented image with the value indicating either a black or white pixel.

Various methods and/or subroutines which may be used to implement one or more of the steps of the main routine 200 will be discussed with regard to various figures after the main routine 200 is described.

Step 204 processes the image data 210 to find punch-hole candidates, e.g., image portions which are to be evaluated as possibly including or being punch holes, in the image. Subroutine 300 of FIG. 3 which will be discussed further below may be, and in some embodiments is used to implement step 204. Upon completion of the identification of the punch-hole candidates in step 204 a list of punch-hole candidates will have been generated and processing in step 206 will commence. In step 206, the punch-hole candidates identified in step 204 are evaluated to find punch holes in the image to be removed. The list of punch-hole candidates may be, and in some embodiments does, include information on the location of pixels in the image which correspond to a punch-hole candidate. Subroutine 400 shown in FIG. 4 which will be discussed further below may be, and in some embodiments is, used to implement step 206.

Step 206 generates, from the list of punch-hole candidates, a list of the punch holes on the image 214. The list of punch holes includes information identifying the pixels determined to correspond to one or more punch holes and their location within the image being processed. The list of punch holes is stored and may later be used in other processing steps of the method, e.g., as part of a punch-hole removal and/or other image enhancement process. Data corresponding to the size, shape and location of each of the identified punch holes on the image can, and in some embodiments, is stored as part of the list of punch holes identified. Alternatively, some of the information may be stored separately from the punch-hole list and correlated with the list in a manner that the information corresponding to a particular punch hole on the list can be readily accessed.

In addition to the generation of the list of punch holes on the image, the processing of step 206 also generates a confidence value of detection for each of the identified punch holes. The confidence value corresponding to an individual punch hole is stored, e.g., as part of the punch-hole list, and may later be used in other steps of the method.

From step 206 operation proceeds to punch-hole removal step 208. Subroutine 500 shown in FIG. 5 which will be discussed further below may be, and in some embodiments is, used to implement step 208. In step 208, the image is processed to remove punch holes in the image 214 and to thereby generate a processed, e.g., enhanced, image which does not include the indentified punch holes. This can, and in some embodiments of the invention is achieved by replacing the foreground color pixel values associated with the pixels compromising the identified punch holes (e.g., black) with the pixel values of the background color of the image (e.g., white). In another exemplary embodiment the color pixel values corresponding to the pixels of each identified punch hole may be replaced with the color pixel value of the portion of the image surrounding each punch hole. In some embodiments more sophisticated punch-hole removal techniques are used with lines and/or other surrounding image content being used to predict the content of the portion of the image which was removed and reconstruction of the punched image area being used to replace the portion of the image determined to correspond to a punch hole. For example, a line found to exit before and after a punch hole may be joined and/or a portion of a text character deleted as the result of a punch hole may be restored. The processed image generated in step 208 may be, and in some embodiments is, stored in memory and then displayed or transmitted. In some embodiments the processed image represents a form with the punch holes removed. The processed form may be subject to additional processing, e.g., character recognition and/or other types of image processing used to obtain useful information from the processed image. As a result of punch-hole removal, subsequent text recognition and/or other processing operation may be enhanced and/or a user viewing the form may find it easier to read and interpret the information included in the processed image. The processed image, like the input image, may be in the form of a set, e.g., file, of binary pixel values.

Upon completion of the removal of the identified punch holes the method will end at step 216 pending input of another image to be processed and repeating of the method 200, e.g., on an image representing a subsequent page of a multi-part document being processed.

Figure 3:
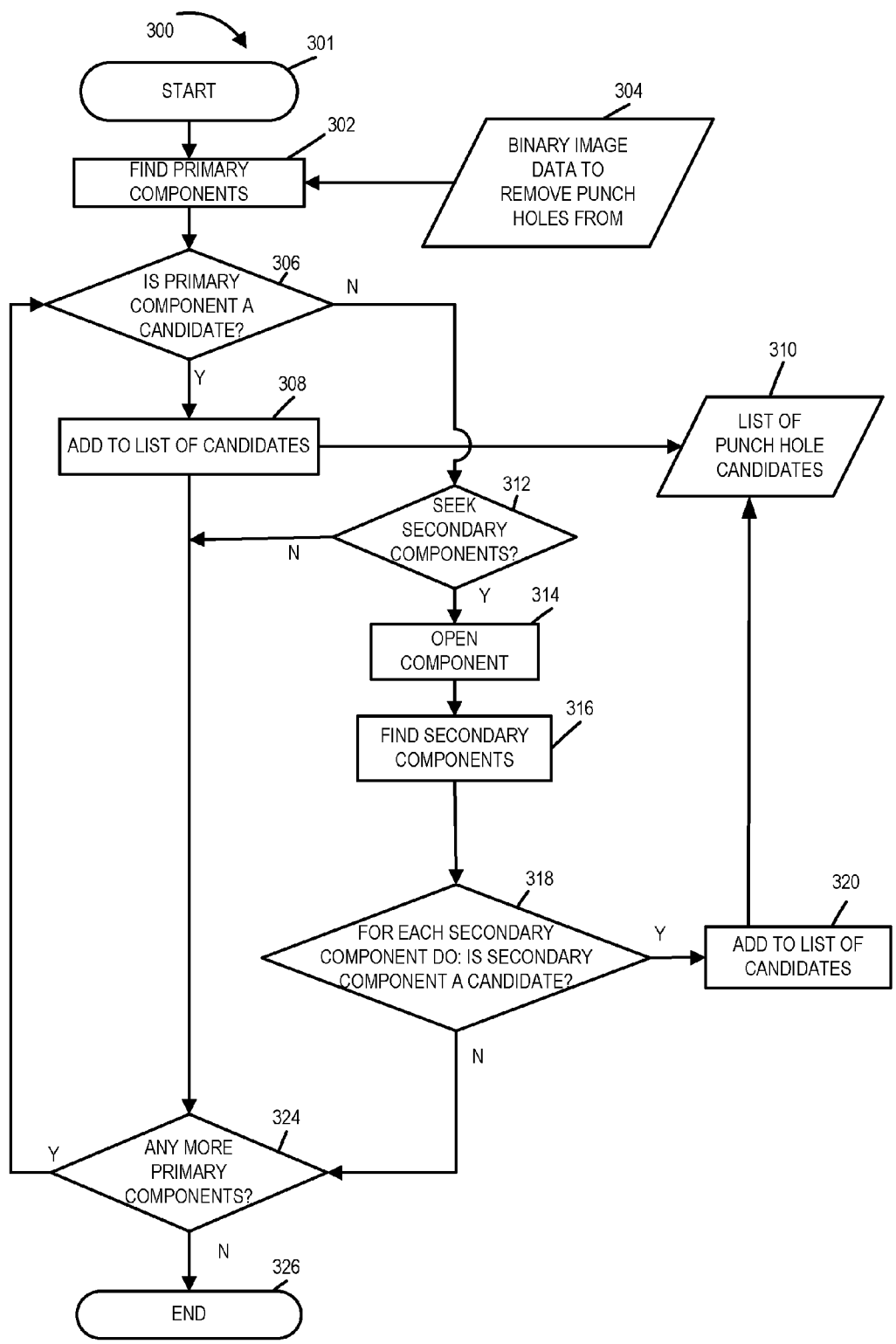
FIG. 3 illustrates an exemplary subroutine which is used for identifying and generating a list of the punch-hole candidates in the image data in accordance with one embodiment of the present invention.

FIG. 3 depicts an exemplary subroutine 300 which may be used for identifying and generating a list of the punch-hole candidates in the image data. The subroutine starts at start step 301, at this point image data 304 including component information is available for processing. A component or image component is a portion of an image, e.g., a portion of a scanned page. Image components may be identified and characterized using a variety of different image processing techniques. One technique that can, and in some embodiments is, used in characterizing components is based on the use of a bounding box which can be used to identify and/or define the area of an image component. In step 302, processing of the image data from which punch holes are to be removed commences. In this step, the image data is processed to find all the primary components of the image. Primary components are components that meet one or more component criteria and which may be later processed or divided into smaller components for additional analysis. Primary components are, in some embodiments, the image components which are generated from an initial division of the image into non-overlapping regions which are to be considered as possible punch-hole candidates.

Constraints which, in some but not necessarily all embodiments are to be satisfied, for an image component to be considered a primary component may be size based. For example, one constraint used in some embodiments is that the primary component be of at least a certain minimum size. Standard image processing techniques may be used to define a bounding box that characterizes the primary components.

In at least one exemplary embodiment the minimum width (number of pixels in one row of the bounding box) and height (number of pixels in one column of the bounding box) of the component's bounding box are both determined by a scaled amount of the square root of the image's height multiplied by the image's width wherein the image width and height are defined as the number of pixels in one row and column of the image respectively.

Another exemplary constraint that may be, and in some embodiments is, used to identify a primary component is the number of pixels from which the component is formed, e.g., between 200 and 5,000,000 pixels. In such an embodiment the primary components will include at least a minimum number of pixels.

In decision step 306, a decision is made as to whether each of the primary components identified in step 302 is a candidate to be a punch hole. One exemplary method of implementing the decision step 306 which determines which primary components are candidates in accordance with the present invention is described below in connection with FIG. 6. If the primary component is a candidate to be a punch hole then processing proceeds from decision step 306 to step 308 wherein the primary component is added to the list of punch-hole candidates 310. The list of punch-hole candidates 310 can be and in some embodiments is stored in memory for later use at least in one embodiment of the present invention. Processing proceeds from step 308 to decision step 324. For those primary components which are initially determined not be punch-hole candidates in decision step 306, processing proceeds to decision step 312 in which a decision is made as to whether the component is a component which should be considered for possible division into secondary components which may then be subject to further analysis. If a component is determined not to be one which is to be subject to consideration as including secondary components, operation proceeds to step 324, otherwise operation proceeds to step 314. Subroutine 1200 of FIG. 12 which will be discussed further below may be, and in some embodiments is used to implement step 312.

In step 314 the component being processed is opened, e.g., examined, and analyzed for possible division into different non-overlapping portions where the different portions of the component are considered as secondary components. In step 316, secondary components are found, e.g., defined. The individual image portions corresponding to the secondary components defined in step 316 are then processed in step 318. Each individual secondary component is analyzed in step 318 to determine if it satisfies criteria which qualify the secondary component being processed as a punch-hole candidate. If the secondary component satisfies the criteria for being a punch-hole candidate it is added to the list of punch-hole candidates 310 in step 320. Once the secondary components have been processed, operation proceeds to decision step 324.

In step 324 a check is made to determine if there are additional primary components to be processed. If the answer is "yes" processing of the next primary component commences at step 306. If the answer is "no" then processing ends for this portion of the method of the present invention at step 326, e.g. with the method continuing using the generated list of punch hole-candidates 310 in other processing steps.

Figure 2:
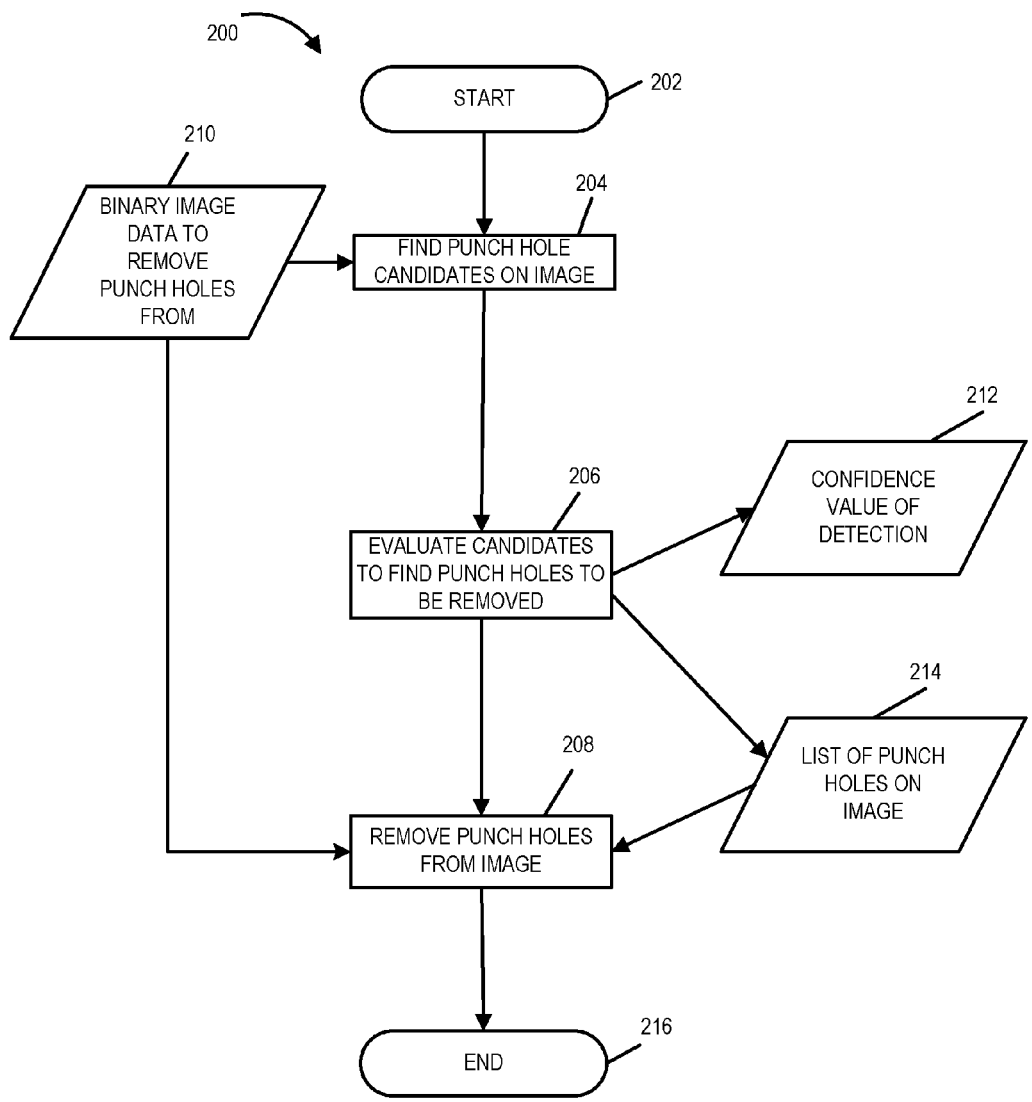
FIG. 2 illustrates an exemplary method of performing the punch-hole image identification and removal process which is used in accordance with one embodiment of the present invention and which may be implemented by the system of FIG. 1.
Figure 4:
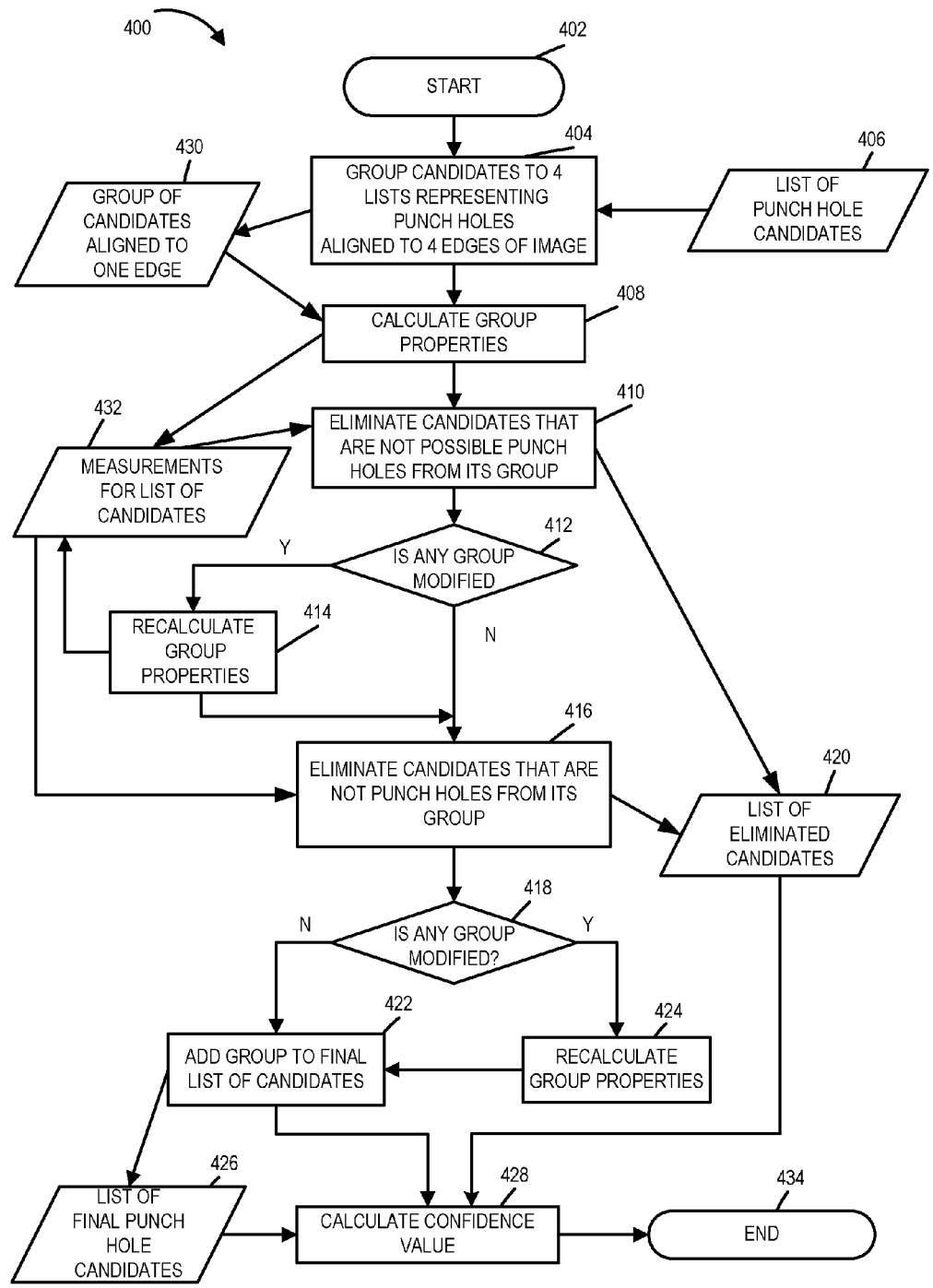
FIG. 4 illustrates an exemplary subroutine which is used for evaluating punch-hole candidates in the image data in accordance with one embodiment of the present invention.

FIG. 4 depicts an exemplary subroutine 400 which may be and in some embodiments of the present invention is used for implementing step 206 of FIG. 2 which evaluates punch-hole candidates to identify those punch holes to be removed from the image. The subroutine starts at start step 402 with subroutine 400 being executed on processor 110 and proceeds to step 404. At this point, image data associated with the previously identified list of the punch-hole candidates 406 is available for processing. Forms and pages of documents typically have four edges with punch holes occurring along one or more edges of the form or page of the document. When the forms or pages of the document are scanned the imaging will also typically have four discernible edges along which the punch holes will be generally aligned. Step 404 processes the list of punch-hole candidates and associated image data 406 grouping the punch-hole candidates into four lists or groups representing punch holes aligned to the four edges of the image. Step 404 will generate as part of its processing step four lists or groups, one list for each edge of the image. The punch-hole candidates along each particular edge will be included with the list for its respective edge. In this processing step, grouping may occur wherein each candidate is only included in one of the four lists/groups, or alternatively a candidate may be included in more than one list/group if for example a punch-hole candidate is at the corner of an image and can be considered as being along both edges that form the corner of the image. After the punch-hole candidates have been grouped into four lists representing the punch holes aligned to the four edges of the image processing proceeds to step 408 where the four lists/groups of punch-hole candidates and associated image data 430 is processed to calculate a set of group properties by which the punch-hole candidates can be evaluated. The measurements and data for the list of candidates 432 resulting from the calculation of the group properties may be and in some embodiments is stored in memory 108 for future use. Processing then proceeds to step 410 wherein each punch-hole candidate in the four lists or groups of punch-hole candidates is evaluated to identify and eliminate those candidates that are not possible punch holes from their respective lists/groups. The identification of which candidates to be eliminated from a group is based on the group properties, data and measurements generated in step 408. In addition to eliminating the candidates from the list/group processing step 410 also generates a list of the eliminated candidates 420 which may be stored in memory 108 for later processing uses including but not limited to additional enhancement processing, character recognition processing, collection of statistical data on the image or the process used to generate the image or punch holes. Subroutine 1300 of FIG. 13 which is discussed further below is an exemplary subroutine which may be and in some embodiments is used to implement the punch hole-candidate evaluation step 410 of FIG. 4 of the present invention. From step 410 processing proceeds to decision step 412. At decision step 412 it is determined whether any of the four groups of punch holes have been modified, that is by the elimination of candidates that could not be possible punch holes in step 410. If any of the groups have been modified then processing proceeds to step 414 where the group properties are re-calculated and the data and measurements for the list of candidates 432 is updated and processing proceeds to step 416. If at decision step 412 it is determined that no group has been modified then processing proceeds to step 416. At step 416 an additional set of comparisons are conducted on the punch-hole candidates based on the measurements for the list of candidates and additional candidates are eliminated from their respective groups. During this step, the list of eliminated candidates 420 is updated to include the additional candidates that have been eliminated. Subroutine 1400 of FIG. 14 which is discussed further below is an exemplary embodiment of the implementation of processing step 416 of FIG. 4 which may be and in some embodiments of the present invention is used. Once processing has been completed at step 416 processing proceeds at decision step 418. As with decision step 412, decision step 418 tests if there have been any modifications to any of the four groups/lists of punch-hole candidates. If any candidates have been eliminated in step 418 then processing proceeds to step 424 where the group properties are recalculated and the measurements for the list of candidates 432 is updated. Processing then proceeds to step 422. If in step 418 it is determined that none of the groups of punch-hole candidates has been modified then processing proceeds to step 422. At step 422, the groups of punch-hole candidates are considered to be final. A list of final punch-hole candidates 426 is generated and may be stored in memory 108. Processing then proceeds to step 428 where a confidence value for each group of candidates is calculated. Processing then proceeds to end step 434 where this portion of processing of the method concludes.

Figure 5:
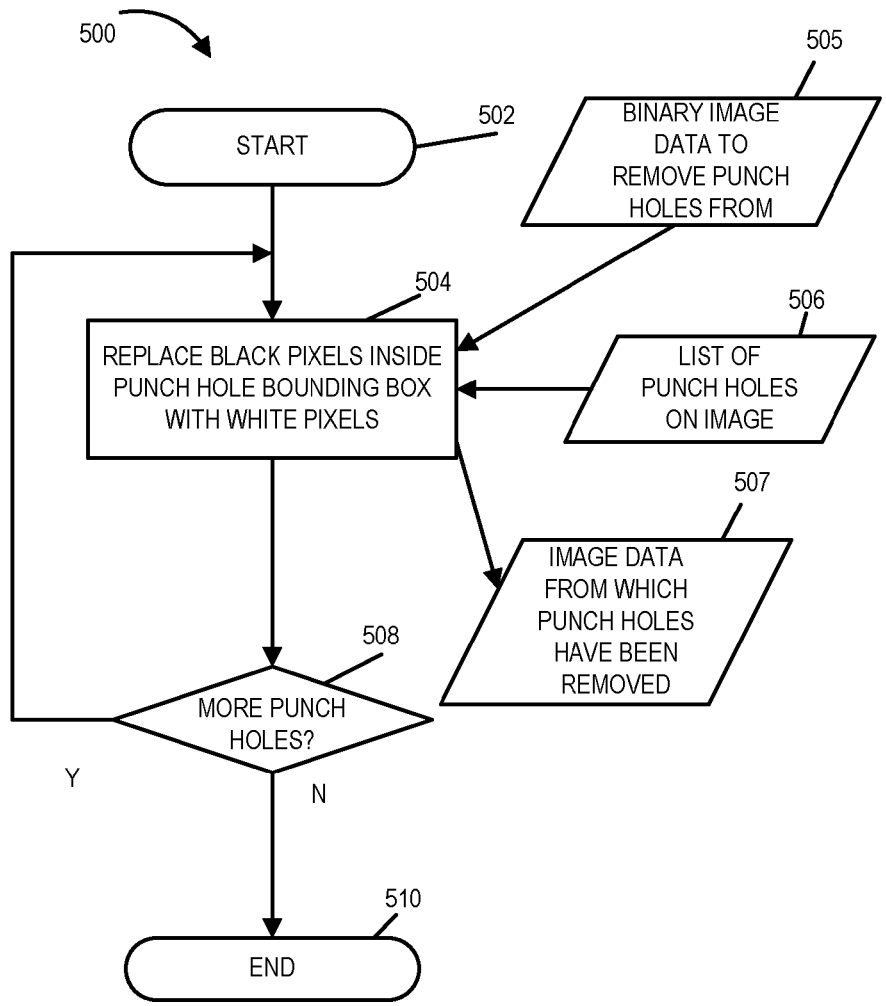
FIG. 5 illustrates an exemplary subroutine which is used to remove the identified punch holes from the image in accordance with one embodiment of the present invention.

FIG. 5 is an exemplary subroutine which may be used to implement step 208 of FIG. 2 in which the identified punch holes are removed from the image. Processing starts at start step 502 with the subroutine 500 being executed on processor 110 and proceeds to step 504. The image data from which the punch holes are to be removed 505 and the list of punch-holes on the image 506 are available for use in this subroutine. At step 504, a component which has been included in the list of punch holes on the image 506 is processed so that the black pixels inside the punch hole bounding box are replaced with white pixels. Upon the completion of the replacement of the black pixels with white pixels processing proceeds to decision step 508. At decision step 508, it is determined if there are any additional punch holes in the list of punch holes on the image 506 which have not yet been removed. If there are additional punch holes then the punch-hole removal process continues at step 504 wherein another punch hole from the punch-hole list 506 is processed. This process continues until at decision step 508 there are no additional punch holes in the punch-hole list that have not been removed from the image. The enhanced image data 507 may then be stored in memory 108. At this point, the processing ends for this portion of the method of the present invention at end step 510. The enhanced image at this point may be outputted to any variety of devices e.g., the display 102 or printed at the printer 104. Additionally, the image may undergo additional image processing operations to enhance other portions of the image. If the image is only a portion of a larger image, the punch-hole identification and removal method may be applied to the other portions of the image in the same manner as described above. If the image was part of a multi-page document or form the punch-hole identification and removal method may also be performed on the other pages of the document before outputting the resulting enhanced images.

Figure 6:
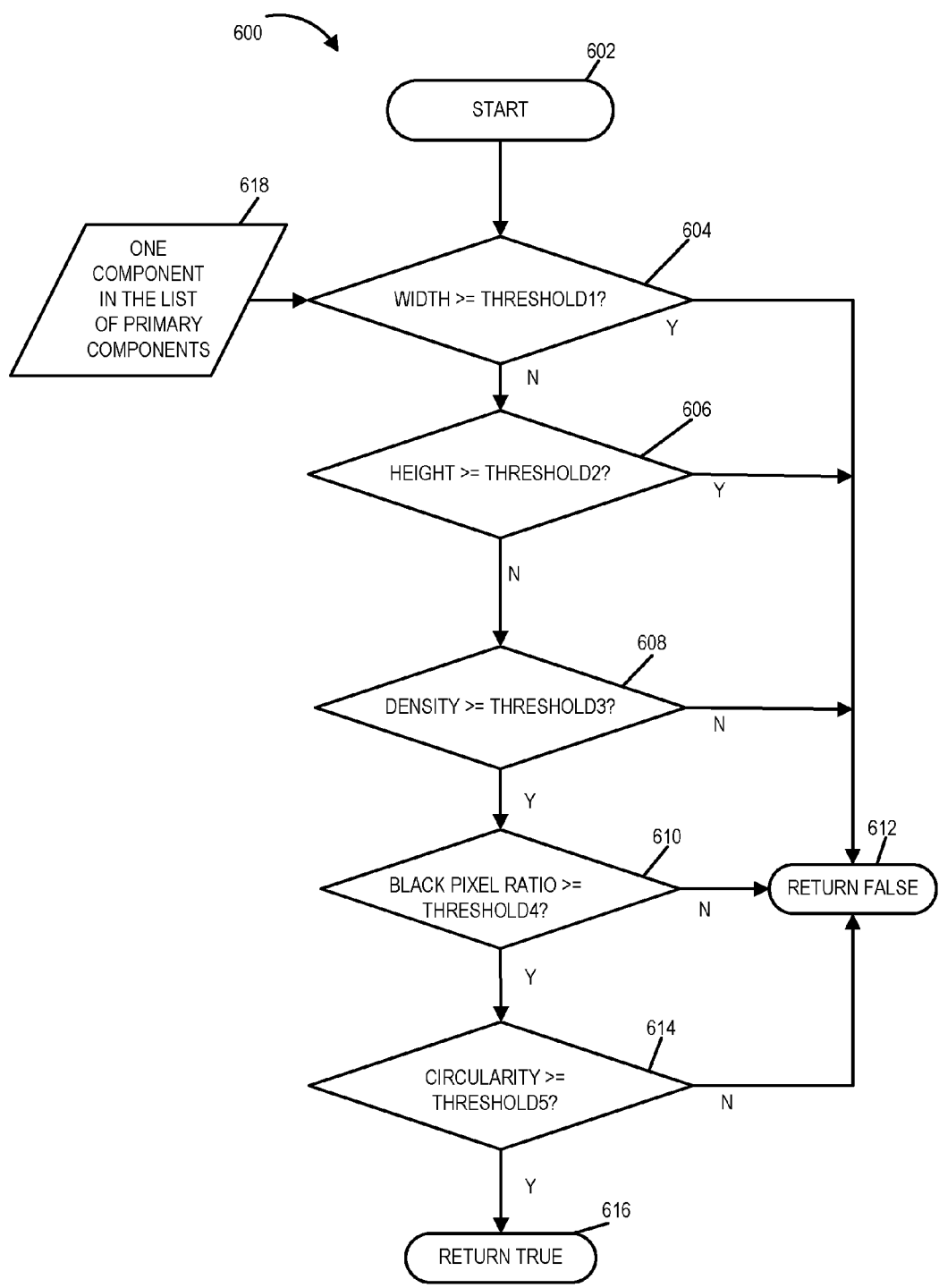
FIG. 6 illustrates an exemplary subroutine which is used to determine whether a primary component is a punch-hole candidate based on various characteristics of the primary component in accordance with one embodiment of the present invention.

FIG. 6 depicts exemplary subroutine 600 which may be and in some embodiments is used to implement decision step 306 of FIG. 3 of the present invention which determines whether a primary component is a punch-hole candidate based on various characteristics of the primary component. While this exemplary subroutine is designed for use with a binary image, e.g., a black and white image, the invention is also applicable to color and gray scale images. Processing starts at start step 602 with the subroutine 600 being executed by the processor 110 and proceeds to step 604 wherein the image data associated with one component in the list of primary components 618 is processed in decision step 604. In decision step 604 the width of the component which may be calculated based on the number of pixels in one row of the bounding box characterizing the primary component is compared to a punch-hole candidate width threshold value referred to as threshold 1. If the component's width is determined to be greater than or equal to threshold 1 then processing proceeds to step 612. If the component's width is less than the value of threshold 1 then the component's height is compared to a punch-hole candidate height threshold value referred to as threshold 2 in decision step 606. The component's height may be calculated as the number of pixels in one column of the bounding box used to characterize the component. If the component's height is greater than or equal to threshold 2 then processing proceeds to step 612. If the component's height is less than threshold 2 then the component's density is compared to a punch-hole candidate density threshold at decision step 608 referred to as threshold 3. For a black and white primary component image, the component's density may be calculated as a ratio of the number of black pixels to the total number of pixels (black and white) in a convex hull surrounding shape. If the component's density is greater than or equal to threshold 3 then processing proceeds to step 612. If the component's density is less than threshold 3 then the component's black pixel ratio is compared to a punch-hole candidate's black pixel ratio threshold referred to as threshold 4 in decision step 610. The component's black pixel ratio is the ratio of the number of black pixels to the total number of pixels (black and white) in the bounding box defining the component. If the component's black pixel ratio is greater than or equal to threshold 4 then processing proceeds to step 612. If the component's black pixel ratio is less than threshold 4 then the component's circularity is compared to a punch-hole candidate circularity threshold referred to as threshold 5 in decision step 614. A component's circularity is a measure of how close a component's shape is to the shape of a circle. As punch holes are typically circular in nature a component's circularity is an important characteristic to be analyzed when attempting to identify components which may be punch holes. Subroutine 800 of FIG. 8 discussed further below may be, and in some embodiments is used to implement the calculation of a component's circularity, which is used in step 614 of FIG. 6. If the component's circularity is determined to be less than threshold 5 then processing proceeds to step 612. If the component's circularity is determined to be greater than or equal to the punch-hole candidate circularity threshold 5 then processing proceeds to step 616. At return step 612 processing ends for this portion of the method with a "false" value being returned to the routine that called subroutine 600 indicating that the primary component evaluated is not a punch-hole candidate. At return step 616 processing ends with a "true" value being returned to the routine that called subroutine 600 indicating that the primary candidate evaluated is a punch-hole candidate.

The punch-hole candidate width and height thresholds, thresholds 1 and 2 respectively, are a function of the image's size. The punch-hole candidate density, black pixel ratio and circularity thresholds, threshold 3, 4, and 5 respectively, are predetermined values and are not a function of the image's size.

Figure 7:
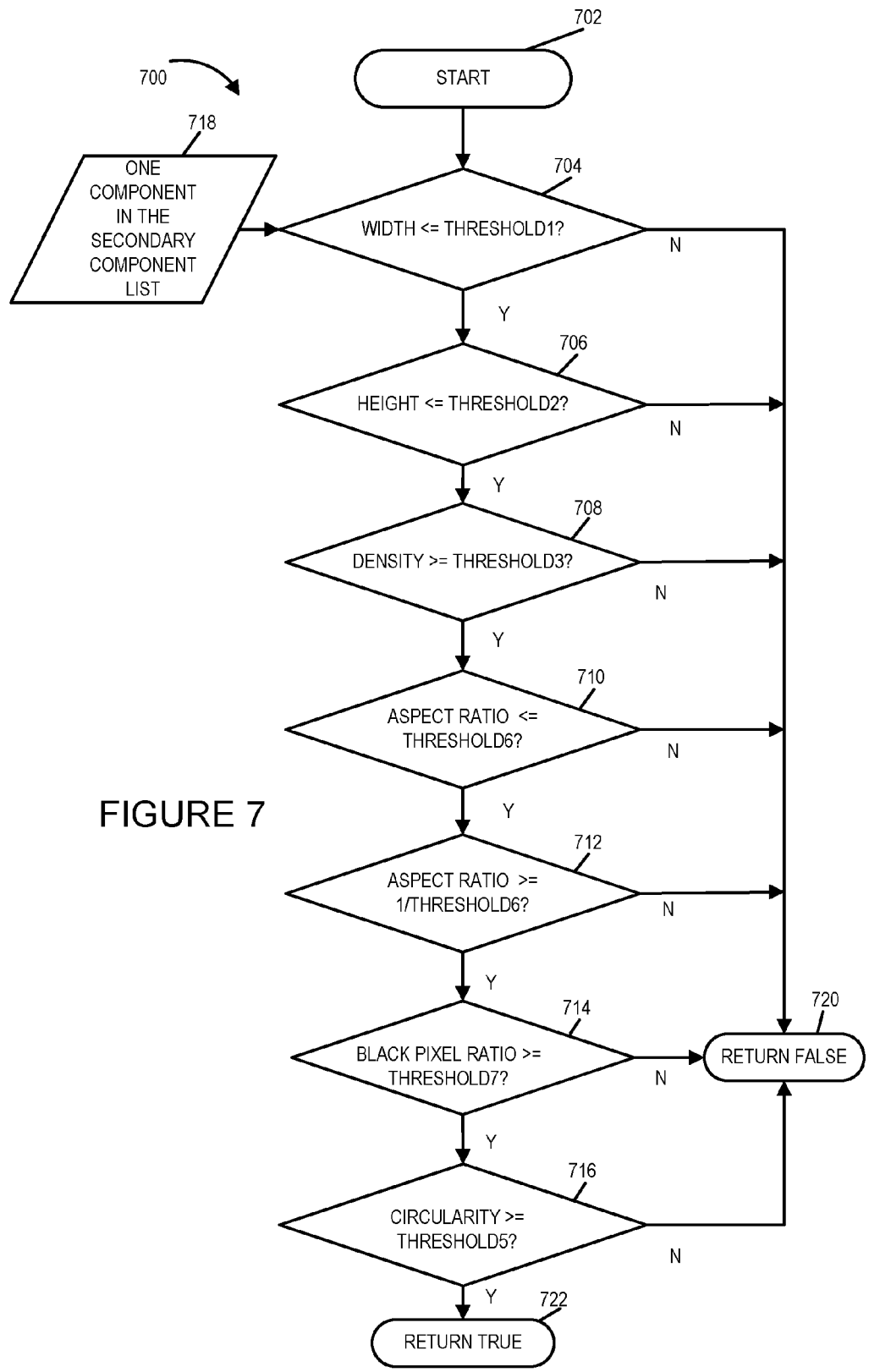
FIG. 7 illustrates an exemplary subroutine which is used to determine whether a secondary component is a punch-hole candidate in accordance with one embodiment of the present invention.

FIG. 7 is an exemplary subroutine 700 which may be and in some embodiments of the present invention is used to implement decision step 318 of FIG. 3 of the present invention which determines whether a secondary component is a punch-hole candidate. Processing starts at start step 702 with the subroutine 700 being executed by the processor 110 and proceeds to step 704 wherein the image data associated with one component in the list of secondary components 718 is processed in decision step 704. In decision step 704 the width of the component is compared to a punch-hole candidate width threshold value referred to as threshold 1. If the component's width is determined to be greater than threshold 1 then a "false" value is returned to the calling routine in step 720 and processing for this portion of the method ends. If the component's width is less than or equal to the value of threshold 1 then the component's height is compared to a punch-hole candidate height threshold value referred to as threshold 2 in decision step 706. If the component's height is greater than threshold 2 then a "false" value is returned to the calling routine in step 720 and the processing for this portion of the method ends. If the component's height is less than or equal to threshold 2 then the component's density is compared to a punch-hole candidate density threshold at decision step 708 referred to as threshold 3. If the component's density is less than threshold 3 then a "false" value is returned to the calling routine in step 720 and the processing for this portion of the method ends. If the component's density is greater than or equal to threshold 3 then the component's aspect ratio is compared to a punch-hole candidate aspect ratio at decision step 710 referred to as threshold 6. A component's aspect ratio is the ratio of the component's width to height and may be calculated using pixels. For example, a component's aspect ratio may be determined by calculating the number of pixels in one row of the component's bounding box by the number of pixels in one column of the component's bounding box. Using numerical values for the example a component with a bounding box having 3 pixels per row and 4 pixels per column has an aspect ratio of 3:4. If the component's aspect ratio is greater than threshold 6 then a "false" value is returned to the calling routine in step 720 and the processing for this portion of the method ends. If the component's aspect ratio is less than or equal to threshold 6 then processing in step 712 determines if the component's aspect ratio is greater than or equal to 1/threshold 6. If it is not then a "false" value is returned to the calling routine in step 720 and processing for this portion of the method ends. If the component's aspect ratio is greater than or equal to 1/threshold 6 then the component's black pixel ratio is compared to a punch-hole candidate black pixel ratio threshold referred to as threshold 7 in step 714. Threshold 7 may be the same value as the punch-hole candidate black pixel ratio threshold 4 discussed in connection with subroutine 600 of FIG. 6. If the component's black pixel ratio is less than threshold 7 then a "false" value is returned to the calling routine in step 720 and the processing for this portion of the method ends. If the component's black pixel ratio is greater than or equal to threshold 7 then the component's circularity is compared to a punch-hole circularity threshold referred to as threshold 5. If the component's circularity is greater than or equal to threshold 5 then a "true" value is returned to the calling routine in step 722 ending the processing for this portion of the method. If the component's circularity is less than threshold 5 then processing proceeds to return step 720 where a "false" value is returned to the calling routine and processing for this portion of the method ends. A "false" value returned during step 720 indicates that the secondary component being analyzed by subroutine 700 is not a punch-hole candidate while a "true" value being returned at step 722 indicates that the secondary component is a punch-hole candidate that warrants further processing and evaluation. This subroutine may be invoked again to evaluate each of the secondary candidates identified in a primary candidate.

Figure 8:
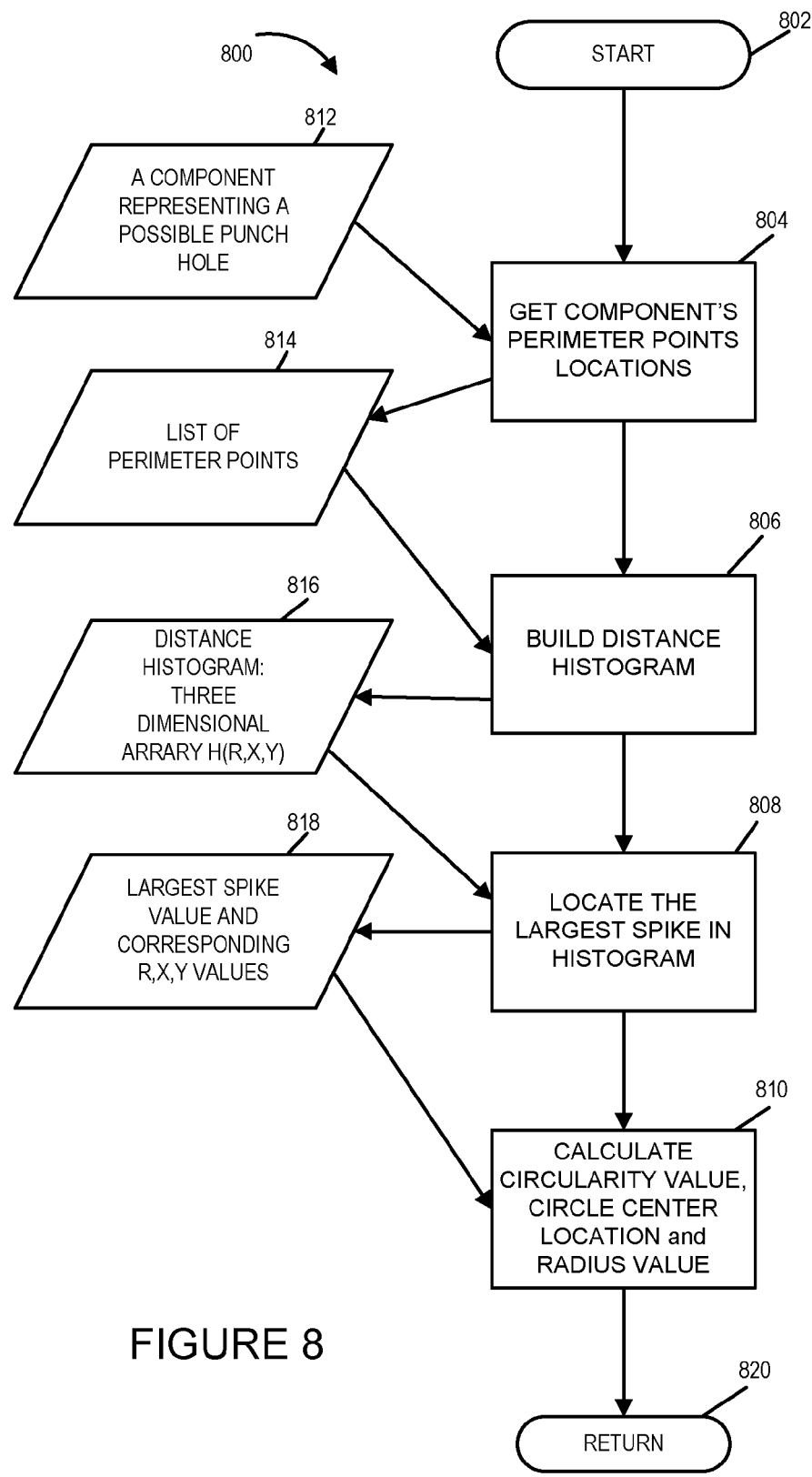
FIG. 8 illustrates an exemplary subroutine which is used in calculating a component's circularity in accordance with one embodiment of the present invention.

FIG. 8 depicts an exemplary subroutine 800 that may be and in some embodiments is used in implementing step 614 of FIG. 6 and/or step 716 of FIG. 7 when calculating a component's circularity. Processing starts at start step 802 with the subroutine 800 being executed on processor 110 and proceeds to step 804. At step 804, a component representing a possible punch hole and its associated image data 812 is processed to determine the component's perimeter point locations. Data and information defining the list of perimeter points 814 for the component may be and in some embodiments of the present invention is stored in memory component 120 of memory 108 for later use. The list of the component's perimeter points may also be stored with the component's image data or separately from the component's image data but associated with the component and its accompanying data. After obtaining the component's perimeter point locations in step 804, processing proceeds to step 806 wherein the list of perimeter point locations of the component are processed to build a distance histogram for each of the possible center points of the component. This is accomplished by taking each of the X, Y pixel locations in the component which are considered a possible circle center and calculating the radius, R, to each of the perimeter locations thereby creating a distance histogram. The distance histogram created in step 806 may be expressed as a three dimensional array H(R,X,Y) where X and Y are the pixel locations in the component which are considered possible circle centers and R is the radius to the component's perimeter points. The value H will be the number of times that for a given X and Y possible circle center pixel location the radius R is measured for each of the perimeter locations. For example, if H(7, 8, 9)=5 and H(6,8,9)=4, H(7,8,9) is more likely the center of the circle for the component because it had 5 perimeter points that matched versus H(6,8,9) which only had 4. Subroutine 900 shown in FIG. 9 which will be discussed below may be, and in some embodiments is, used to implement the process of building the component's distance histogram in step 806. The distance histogram H(R,X,Y) 816 may be and in some embodiments of the invention is stored in memory 108 for later use. In step 808, the component's set of distance histograms is analyzed to locate the largest spike in the set of histograms, i.e., the histogram H(R,X,Y) with the highest count. The largest spike value or count and the corresponding radius, and X, Y, pixel center point values 818 may be and in some embodiments are stored in memory 108 for later use either with the component's data or separately from the component but associated with the component. This data is then used in processing step 810 to calculate the component's circularity value, circle center pixel location (X and Y), and radius value (R). Circularity is calculated by dividing the count of the H(R,X,Y) with the highest value by the number of pixels on the actual perimeter of the component. These values may be and in some embodiments are then stored in memory 108 for later use. Once the component's circularity value has been calculated and the corresponding circle center's location, X and Y pixel location values, and radius value, R, have been determined processing proceeds to return step 820 where processing in connection with this portion of the method ends with the return of the circularity, radius and circle center location values to the routine which invoked subroutine 800.

Figure 9:
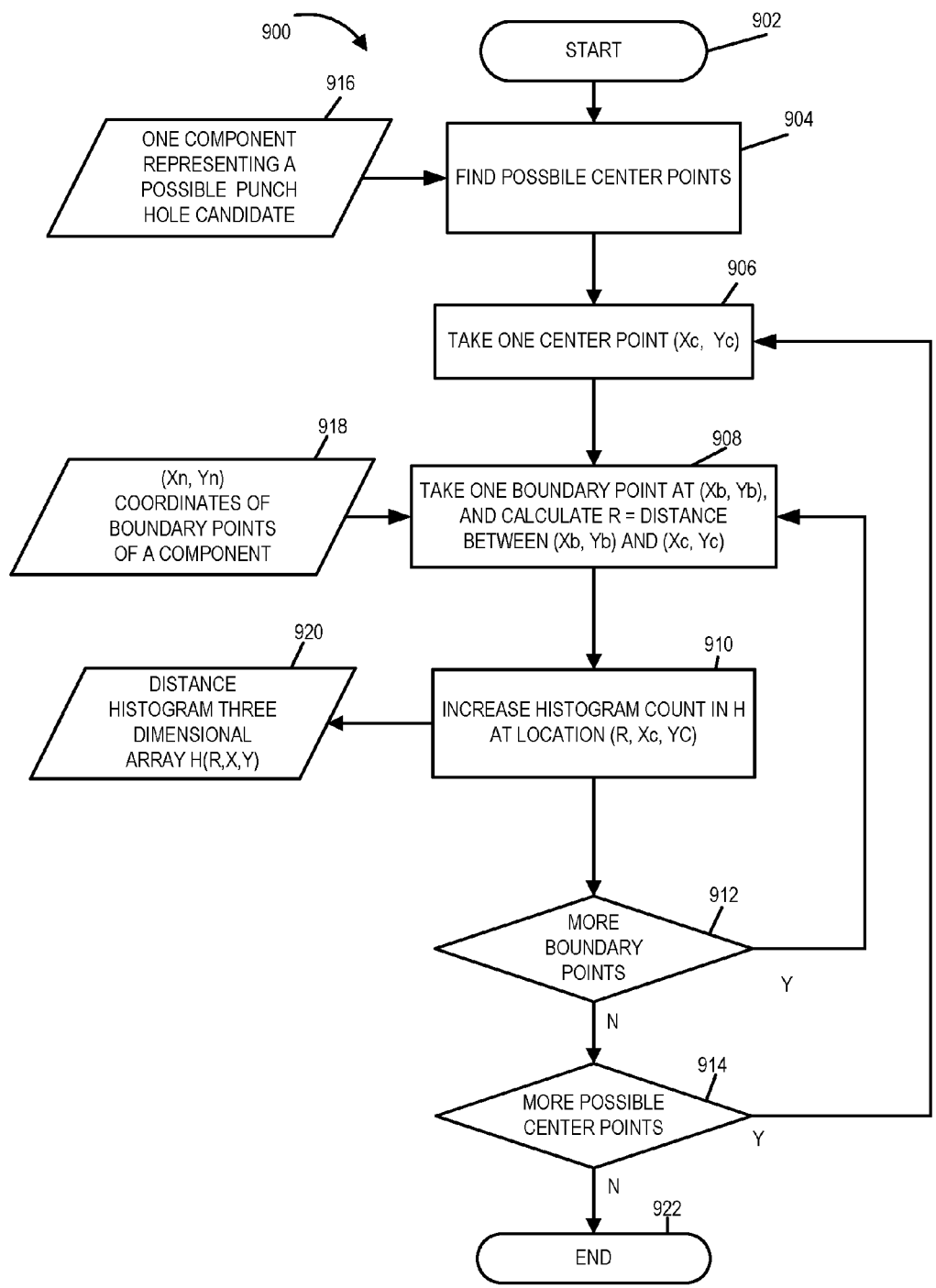
FIG. 9 illustrates an exemplary subroutine which is used to build a distance histogram to calculate the circularity of a component's shape based on the component's perimeter or boundary points and possible center point locations in accordance with one embodiment of the present invention.

FIG. 9 depicts an exemplary subroutine 900 which may be and in some embodiments of the present invention is used to implement step 806 of FIG. 8 which builds a distance histogram to calculate the circularity of the component's shape based on the component's perimeter or boundary points and possible center point location. The subroutine 900 starts at start step 902 with subroutine 900 being executed on processor 110 and proceeds to step 904. At step 904, one component's data 916 is processed to determine the possible center points of the component. Once the possible center points are determined at step 904 processing proceeds to step 906 where one center point is taken from the set of possible center point locations. The possible center point pixel location may be represented as X and Y coordinates of the image data expressed as (Xc, Yc) where c is an integer variable representing each possible center point in the component. The coordinates of the perimeter location points of the component also referred to as boundary points may be represented as (Xn, Yn) coordinates wherein n is an integer variable and each value of n represents a different boundary point on the component. At step 908, the radius R is calculated in accordance with the formula R=distance between (Xb, Yb) and (Xc, Yc) wherein (Xb, Yb) are the coordinates of a single boundary point of the component and (Xc, Yc) are the coordinates of one possible center point of the component. At step 910, a three dimensional distance histogram array H(R,X,Y) 920 is created for the component and the histogram count H at location (R, Xc, Yc) is increased. The H(R,X,Y) histogram and associated data may be and in some embodiments is stored in memory for use in later image processing operations. After the completion of processing of step 910, processing proceeds to decision step 912. At decision step 912, it is determined if there are more component boundary points that need to be processed in connection with this possible center point. If there are additional boundary points then processing proceeds at step 908 with the next boundary point of the component. If at decision step 912, there are no additional boundary points to be processed in connection with this possible center point then processing proceeds to decision step 914. At decision step 914, it is determined whether there are more possible center point locations of the components. If there are additional possible center points then processing proceeds from step 906 with the next possible center point location. If there are no additional center points at step 914, then processing to create the three dimensional distance histogram array for the component's possible center points will have been completed and the processing of this portion of the method comes to an end at step 922. The distance histogram created by subroutine 900 can then be used to determine the component's circularity as previously described in connection with FIG. 8.

Figure 10:
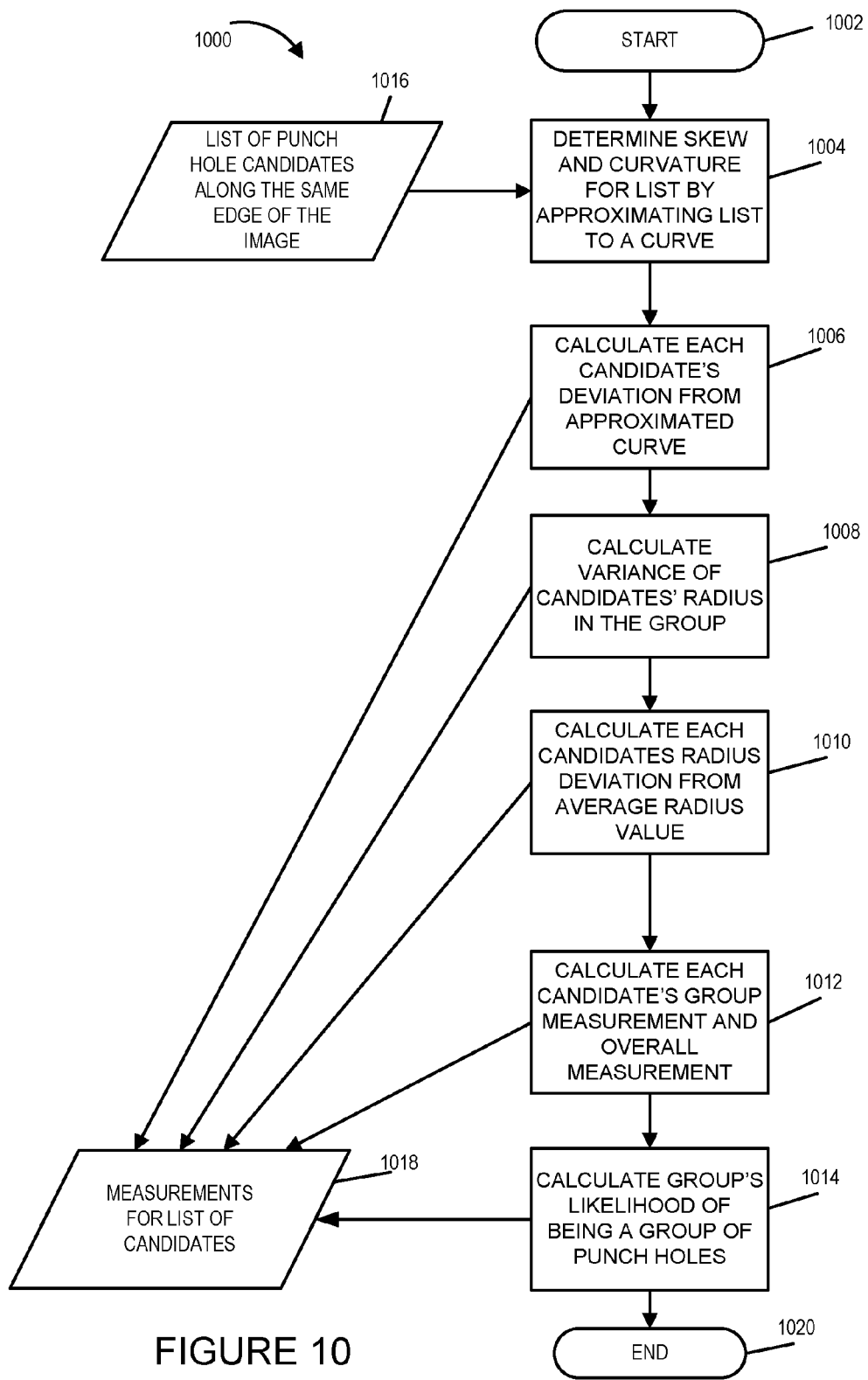
FIG. 10 illustrates an exemplary subroutine which is used to calculate the properties of a group or list of punch-hole candidates in accordance with one embodiment of the present invention.

FIG. 10 depicts an exemplary subroutine 1000 which may be and in some embodiments of the present invention is used to implement step 408 of FIG. 4 to calculate the properties of a group or list of punch-hole candidates. The subroutine 1000 starts at start step 1002 with the subroutine 1000 being executed on processor 110 and proceeds to step 1004. At step 1004 the group or list of punch-hole candidates along one edge of the image is processed to determine the skew and curvature for the punch-hole candidates in the list by approximating the punch-hole candidates in the list to a curve. Subroutine 1100 of FIG. 11 is an exemplary embodiment that may be and in some embodiments of the present invention is used to implement step 1004 of FIG. 10.

Figure 11:
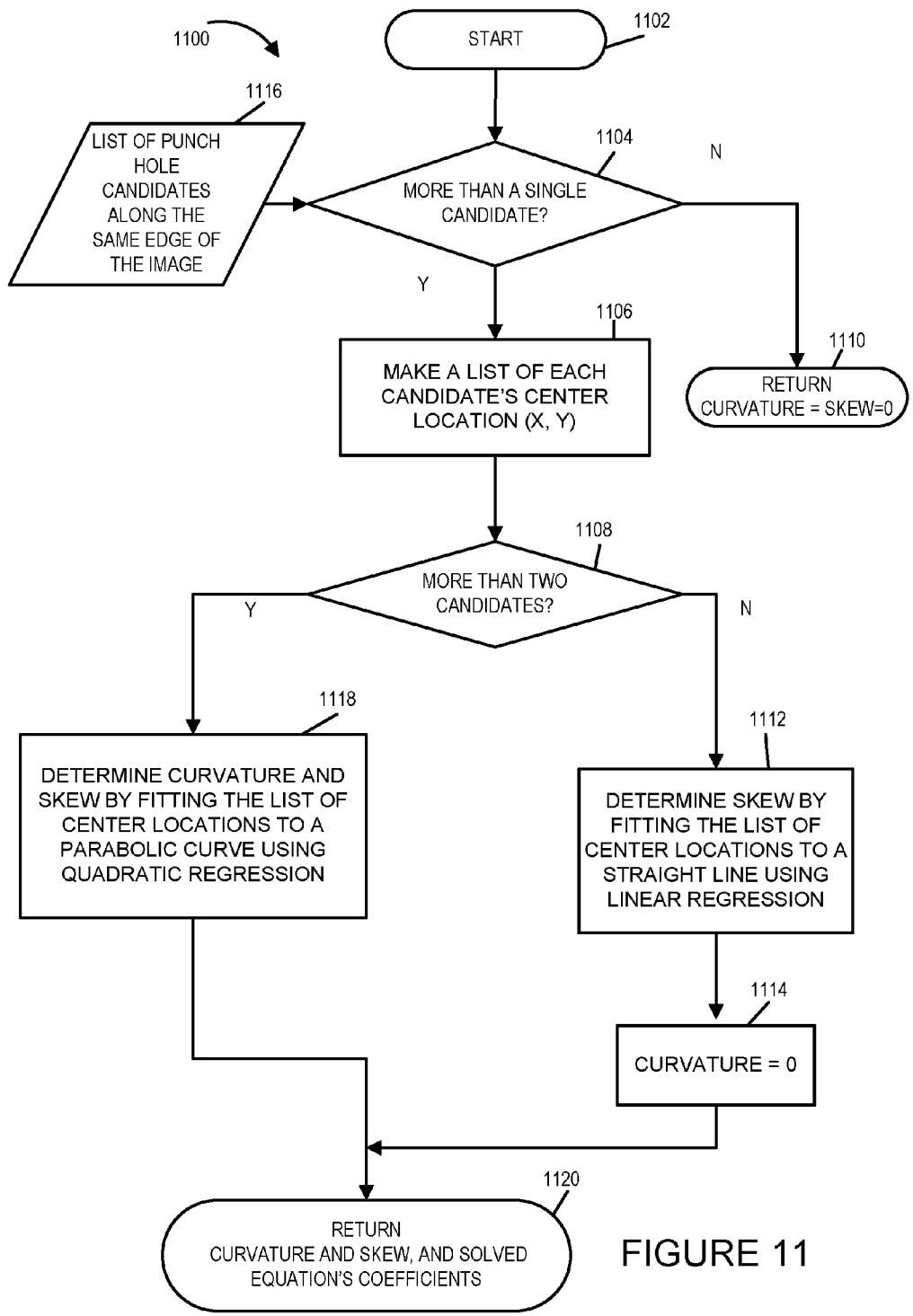
FIG. 11 illustrates an exemplary subroutine that is used to determine the skew and curvature for the punch-hole candidates in a group of punch holes.

Subroutine 1100 of FIG. 11 starts at step 1102 with the subroutine 1100 being executed on processor 110 and processing proceeds to decision step 1104. At decision step 1104, a list of hole-punch candidates for punch holes potentially occurring along the same edge of the image 1116 is processed to determine whether the list includes more than a single punch-hole candidate. If the list only includes a single punch-hole candidate then processing proceeds to return step 1110. At return step 1110 skew and curvature values of zero are returned to the routine that called subroutine 1100 and the processing for this portion of the method is ended. If however it is determined at step 1104 that there is more than a single candidate in the list of punch-hole candidates occurring along the same edge of the image being analyzed then processing proceeds to step 1106 where a list of each punch-hole candidate's center location (X,Y) is generated. This information may be stored in memory 108 along with data associated with each of the punch-hole candidates for use in later image processing steps or statistical analysis. Once the list of each punch-hole candidate's center location (X,Y) is generated processing proceeds to decision step 1108. At decision step 1108, if it is determined that there are more than two punch-hole candidates in the list of punch-hole candidates then processing proceeds to step 1118 otherwise processing proceeds to step 1112. At step 1118, the punch-hole candidates' circle centers are estimated to be located on a parabolic curve. The curvature and skew of this list of punch-hole candidates is then determined by mathematically fitting the list of each candidate's center locations generated in step 1106 to a parabolic curve. This may be achieved for example by using quadratic regression. For example, an approximation may be made that punch-hole candidates' circle centers are located on a parabolic curve expressed as shown below.

$$x_n \approx a + b y_n + c 4 y_n (1 - y_n/H)$$

Where $x_n$ and $y_n$ are circle center's coordinates, H is the image's height (e.g., number of pixels in a column of the bounding box characterizing the punch-hole candidate) and W is the image's width (number of pixels in a row of the bounding box characterizing the punch-hole candidate).
Equations:

$$Na + S_y b + S_g c = S_x,$$

$$S_y a + S_{yy} b + S_{yg} c = S_{xy},$$

$$S_y a + S_{yg} b + S_{gg} c = S_{xg}.$$

Where
$g_n = c 4 y_n (1 - y_n/H)$,
$S_y = \Sigma_{n=1}^{N} y_n$,
$S_x = \tau_{n=1}^{N} x_n$,
$S_g = \Sigma_{n=1}^{N} g_n$,
$S_{xy} = \Sigma_{n=1}^{N} x_n y_n$,
$S_{xg} = \Sigma_{n=1}^{N} x_n g_n$,
$S_{xx} = \Sigma_{n=1}^{N} x_n^2$,
$S_{yy} = \Sigma_{n=1}^{N} y_n^2$,
$S_{yg} = \Sigma_{n=1}^{N} y_n g_n$,
$S_{gg} = \Sigma_{n=1}^{N} g_n^2$, After solving the above equations in step 1118, for example by implementing Cramer's rule, the values of variables a, b, and c are determined. The curvature and skew of the parabolic curve to which the list of punch-hole candidate center locations were fit are equal to the magnitude of variables c and b respectively. That is the curvature=|c| and skew=|b|. The parabolic equations utilized and the resulting data from the equations may be stored in memory 108 so it is accessible for later access and use. The data may for example be associated with data for each of the candidates in the list of punch-hole candidates or alternatively within a data structure representing the specific edge of the image for which the list or group of punch holes candidates were analyzed. After the curvature and skew have been determined processing proceeds to return step 1120.

When it is determined at step 1108 that there are only two punch-hole candidates in the list or group of candidates along the same edge of the image 1116 being analyzed then step 1112 determines the skew by mathematically fitting the two center locations of the punch-hole candidates in the list to a straight line. This may be achieved for example by using linear regression. The mathematical expression is:

$$x_n \approx a + b y_n$$

Where $x_n$ and $y_n$ are the circle center's coordinates for each of the punch-hole candidates in the list.

Equations:

$$Na + S_y b = S_x,$$

$$S_y a + S_{yy} b = S_{xy},$$

After solving the above equation in step 1112, for example by implementing Cramer's rule, the value of variables a and b are determined. The skew of the line to which the list of punch-hole candidate center locations were fit is equal to the magnitude of b. That is skew=|b|. Once the skew has been determined at step 1112 processing proceeds to step 1114. As the center locations of the two punch-hole candidates were fitted to a straight line the curvature is set to 0 at step 1114 and processing proceeds to the return step 1120. The equation utilized in the analysis of the two center point locations of punch holes in the list and the resulting data from the equations and the assignment of the curvature value to 0 may be stored in memory 108 so it is accessible for later access and use. The data may for example be associated with data for each of the candidates in the list of punch-hole candidates or alternatively within a data structure representing the specific edge of the image for which the list or group of punch holes candidates was analyzed.

At return step 1120 the curvature, skew, and solved equation and coefficients are return to the routine that called subroutine 1100. At this point, processing for this portion of the method is concluded.

Returning to FIG. 10, in step 1006, processing proceeds so that each punch-hole candidate's deviation from the curve defined by the coefficients and equations returned in step 1120 is calculated. The punch-hole candidate's curve deviation may be and in some embodiments is calculated as follows using the punch-hole candidate's center location (X,Y) and curve coefficients to which its group was approximated in to in step 1004, i.e., the value of a, b, and c in the equation $x_n \approx a + b y_n + c 4 y_n (1 - y_n/H)$, in the case of 3 or more candidates in the group, or $x_n \approx a + b y_n$ in case of 2 candidates in the group. These equations are for the group along the vertical edges. In the case of groups along the horizontal edges the Xn and Yn in these equations are just exchanged. For a candidate's Y value, we calculate an X' value using the curve equation: X'=a+b*Y+c*4*Y(1-Y/H), and the curve deviation of the candidate=|X'-X| (i.e., the absolute value of (X'-X). Similarly, for groups along horizontal edges curve deviation=|Y'-Y| (i.e., the absolute value of (Y'-Y)).

Once the curve deviation for each of the punch-hole candidates in the list has been calculated, processing proceeds to step 1008 where the variance of the radius of the punch-hole candidates in the list/group is calculated. The radius of the punch-hole candidate is the radius calculated in FIG. 8 in connection with the calculation of the punch-hole candidate's circularity. The result of step 1008 group radius variation calculation will be a single radius variation value for the entire list/group of punch-hole candidates being analyzed. Once the group radius variation has been calculated processing proceeds to step 1010 where each punch-hole candidate's deviation from the average group radius value is calculated. The result of processing step 1010 is a set of individual radius deviation values correlated to each punch-hole candidate. Each punch-hole candidate's radius deviation may also be referred to as the candidate's size deviation. Processing then proceeds to step 1012 wherein processing of each punch-hole candidate's curve deviation calculated in step 1006 and size deviation calculated in step 1010 is utilized to calculate each punch-hole candidate's group measurement and overall measurement which may be and in some embodiments is used in one or more later processing steps to determine the confidence level or likelihood that the group or list of punch-hole candidates contains a group of punch holes. Each punch-hole candidate's group measurement may be determined in accordance with the following weighted equation using the candidate's size and curve deviations and wherein weight 1 and weight 2 are constant values.

Candidate's group measurement=(candidate's size deviation*weight 1+candidate's curve deviation*weight 2)/(weight 1+weight 2)

A candidate's overall measurement may be determined in accordance with the following weighted equation using the candidate's circularity from step 810, density, black pixel ratio, normalized edge distance, size deviation, curve deviation and wherein weight 1, weight 2, weight 3, weight 4, weight 5, and weight 6 are constant values.

Candidate's overall measurement=(candidate's circularity*weight 3+candidate's density*weight 4+candidate's black pixel ratio*weight 5+candidate's normalized edge distance*weight 6+candidate's size deviation*weight 1+candidate's curve deviation*weight 2)/(weight 3+weight 4+weight 5+weight 6+weight 1+weight 2)

If the punch-hole candidate is on the image's left or right edge, a candidate's normalized edge distance=(distance of candidate's center to its edge)/((image width*2)*100). If the punch-hole candidate is on the image's top or bottom edge, then a candidate's normalized edge distance=(distance of candidate's center to its edge)/(image height*2)*100. Weight 1 and weight 2 are the same weight 1 and weight 2 constants used in calculating the candidate's group measurement. Exemplary values of the weights are:
weight 1=1
weight 2=1
weight 3=2
weight 4=2
weight 5=1
weight 6=1

Once each of the punch-hole candidate's group and overall measurement have been calculated processing proceeds to step 1014 where the likelihood or confidence level of the group being a group of punch holes is calculated. For example, the group's likelihood of being a group of punch holes may be and in some embodiments is calculated using the following weighted equation which provides an integer value ranging from 0 to 100 indicating the likelihood of the group containing punch holes with 100 being the most likely and 0 being the least.

Group's Likelihood=(average of each of candidate's overall measurement*weight 7+group size variation*weight 8+group curvature*weight 9+group skew*weight 10+count factor*weight 11)/(weight 7+weight 8+weight 9+weight 10+weight 11)

Weight 7, weight 8, weight 9, weight 10, and weight 11 of the equation are constant values. The count factor refers to a variable that is chosen based on the number or count of candidates in the group of punch-hole candidates under evaluation. Exemplary values that may be and in some embodiments of the present invention are used include:
weight 7=1
weight 8=1
weight 9=4
weight 10=4
weight 11=1

With an exemplary count factor having one of three possible values depending on the number or count of candidates in the group of punch-hole candidates under evaluation. The count factor=0, if the number of candidates in the group is less than 2; the count factor=100, if the number of candidates in the group is equal to 2 or 3; and the count factor=75 if the number of candidates is any other value (i.e., any number greater than 3).

The data, equations, measurements and results of calculations performed on the list of punch-hole candidates in processing steps 1006, 1008, 1010, 1012, 1012, 1014 referred to herein as measurements for list of punch-hole candidates 1018 may be and in some embodiments is stored in memory 108 for potential later use in further processing or image enhancement operations. After processing for step 1014 finishes processing proceeds to end step 1020 where processing for this portion of the method ends.

Figure 12:
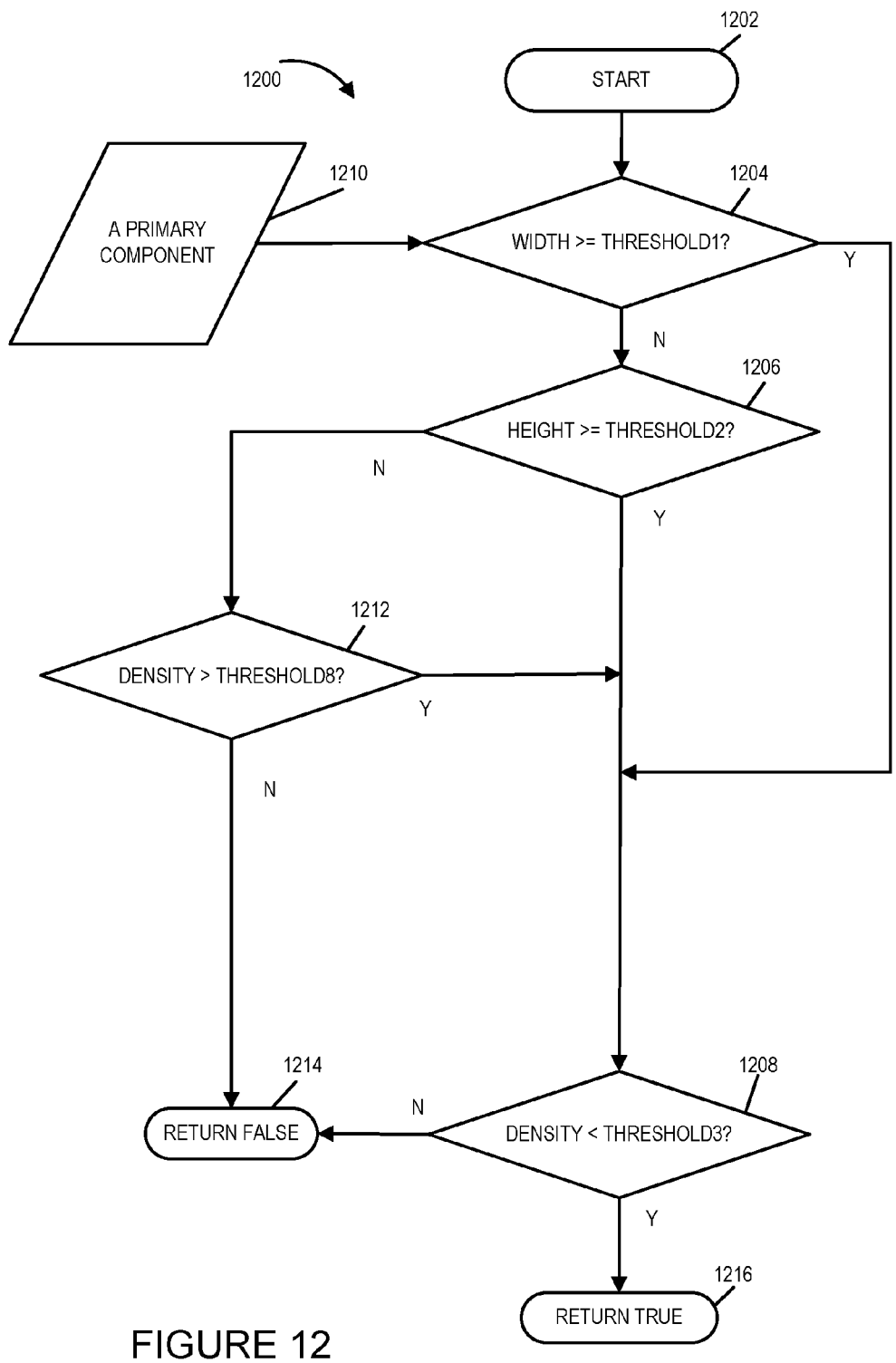
FIG. 12 illustrates an exemplary subroutine which is used to determine whether a primary component should be considered for possible division into secondary components for further processing or not in accordance with one embodiment of the present invention.

FIG. 12 depicts an exemplary subroutine 1200 which may be and in some embodiments is used to implement decision step 312 of FIG. 3 of the present invention which determines whether a primary component should be considered for possible division into secondary components for further processing or not. Using the component's width, density, and/or height, the subroutine is able to determine whether further punch-hole analysis is warranted on this component in accordance with the present invention. The subroutine 1200 starts at start step 1202 with the subroutine 1200 being executed on processor 110 and proceeds to step 1204. At this point a primary component of the image and associated data 1210 including the component's width, height and density is available for processing. In step 1204 the primary component's width is compared to a punch-hole candidate width threshold value 1204 referred to as threshold 1. If the primary component under analysis has a width greater than or equal to threshold 1 then processing proceeds to decision step 1208. If the primary component's width is less than threshold 1 then processing proceeds to decision step 1206 wherein the primary components height will be tested. In decision step 1206, the component's height is compared to a punch-hole candidate height threshold value referred to as threshold 2. If the component's height is determined to be greater than or equal to threshold 2 then processing proceeds to step decision step 1208. However, if in decision step 1206 the component's height is determined to be less than threshold 2 then the processing proceeds to decision step 1212. At decision step 1212, the component's density is compared to a punch-hole candidate's density threshold referred to as threshold 8. If the component's density is greater than threshold 8 processing proceeds to decision step 1208. If the component's density threshold is determined to be less than or equal to threshold 8 then subroutine 1200 has determined that the component does not have the height, weight and density characteristics making it suitable for additional division into secondary components. At this point, processing proceeds to return step 1214. At decision step 1208, the density of the component is compared to a punch-hole candidate density threshold referred to as threshold 3. If the component's density is greater than or equal to threshold 3 then the subroutine has determined that the component should not be divided into secondary components and processing proceeds to return step 1214. At return step 1214, processing of this portion of the method concludes with a "false" value being returned to the calling routine indicating that the primary component is not a punch hole and is not a candidate for potential division into secondary components which may be punch holes. If at decision step 1208, it is determined that the component's density is less than threshold 3 than the routine has determined that the component is a candidate for division into secondary components and processing proceeds to return step 1216. At return step 1216 processing for this portion of the method is completed and a "true" value is returned to the calling routine indicating that the component is a candidate for division into secondary components and further processing to determine whether it may contain punch holes.

Figure 13:
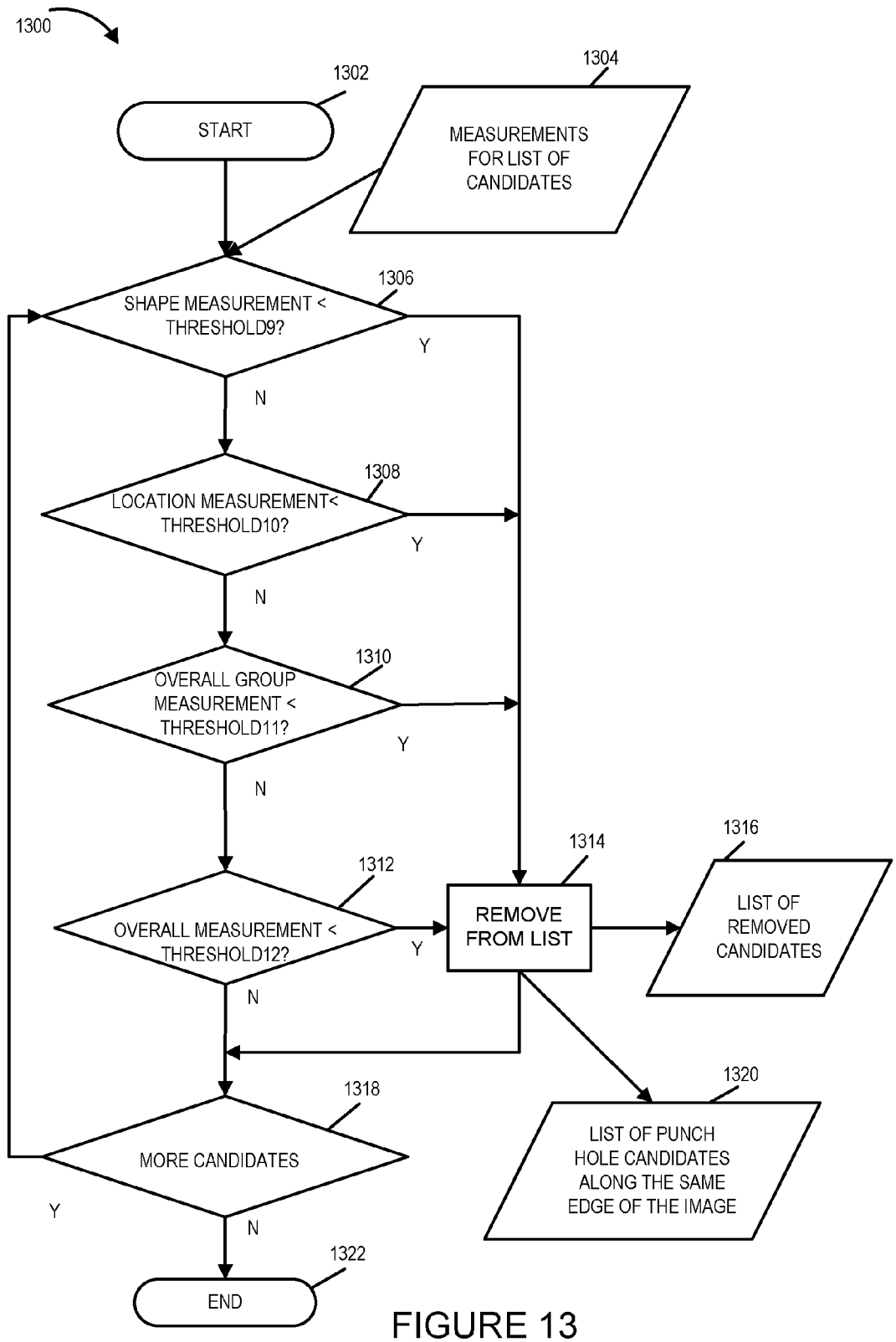
FIG. 13 illustrates an exemplary subroutine which is used to eliminate from a group of punch-hole candidates, those candidates which are not possible punch holes based on a combination of the candidate's component-level and group-level properties in accordance with one embodiment of the present invention.

FIG. 13 depicts an exemplary subroutine 1300 which may be and in some embodiments is used to implement step 410 of FIG. 4 of the present invention which eliminates from a group of punch-hole candidates aligned to one edge of the image those candidates that based on a combination of the candidate's properties and the properties of the group it is associated with are determined to not be possible punch holes. Subroutine 1300 achieves this result by evaluating each potential punch-hole candidate in the group one at one time. It compares each potential punch-hole candidate's properties to a set of thresholds including for example, the potential punch hole's shape measurement, location measurement, group measurement and overall measurement, to identify which potential candidates in the group are not possible punch holes. It then removes these candidates from the list of punch-hole candidates grouped by their position being along the same edge of the image. The processing steps used to implement subroutine 1300 will now be discussed in further detail. The subroutine 1300 starts at start step 1302 with the subroutine 1300 being executed on processor 110 and proceeds to decision step 1306. At decision step 1306, processing of the properties associated with a potential punch-hole candidate, including the measurements for the list of punch-hole candidates 1304, commences. In step 1306, the punch-hole candidate's shape measurement is compared to a punch-hole shape threshold value referred to as threshold 9. The punch-hole candidate's shape measurement is determined based on various characteristics of the candidate's shape which may and in some embodiments of the present invention does include the candidate's circularity, density and black pixel ratio. The following equation may be and in some embodiments of the present invention is used to calculate the candidate's shape measurement.

Candidate's shape measurement=(candidate's circularity*weight 3+candidate's density*weight 4+candidate's black pixel ratio*weight 5)/(weight 3+weight 4+weight 5) wherein weight 3, weight 4, and weight 5 are constant values and may be the same values as weight 3, weight 4, and weight 5 used in connection with the calculation of the candidate's overall measurement. If the punch-hole candidate's shape measurement is less than threshold 9 then the processing proceeds to remove from list step 1314. If the punch-hole candidate's shape measurement is greater than or equal to threshold 9 then processing proceeds to decision step 1308. At step 1308, the punch-hole candidate's location measurement, that is the distance of the punch-hole candidate from the edge of the image, is compared to a punch-hole location measurement threshold referred to as threshold 10. If the punch-hole candidate's location measurement is less than threshold 10 then processing proceeds to remove from list step 1314 otherwise processing proceeds to decision step 1310. At decision step 1310, a punch-hole candidate's overall group measurement is compared to a punch-hole overall group measurement threshold referred to as threshold 11. If the punch-hole candidate's overall group measurement is less than threshold 11 then processing proceeds to remove from list step 1314 otherwise processing proceeds to decision step 1312. At decision step 1312, a punch-hole candidate's overall measurement is compared to a punch-hole overall measurement threshold referred to as threshold 12. If the punch-hole candidate's overall measurement is less than threshold 12 then processing proceeds to remove from list step 1314; otherwise processing proceeds to decision step 1318. At processing step 1314, those punch-hole candidates that failed to meet the criteria necessary to be a punch hole in subroutine 1300 are added to the list of punch-hole candidates 1316 and removed from the list of punch-hole candidates along the same edge of the image 1320. The lists may then be saved in memory for future use in future processing steps of the present invention or other image processing enhancements. Processing then proceeds from step 1314 to decision step 1318. At decision step 1318 it is determined whether there are additional punch-hole candidates that need to be evaluated. If there are additional punch-hole candidates that need to be evaluated then processing proceeds to step 1306 where the next punch-hole candidate's characteristics and measurements begin being evaluated. If there are no additional punch-hole candidates to be evaluated then processing proceeds from decision step 1318 to end step 1322. At end step 1322, the processing of the portion of the method implemented by exemplary subroutine 1300 of the present invention is concluded.

Figure 14:
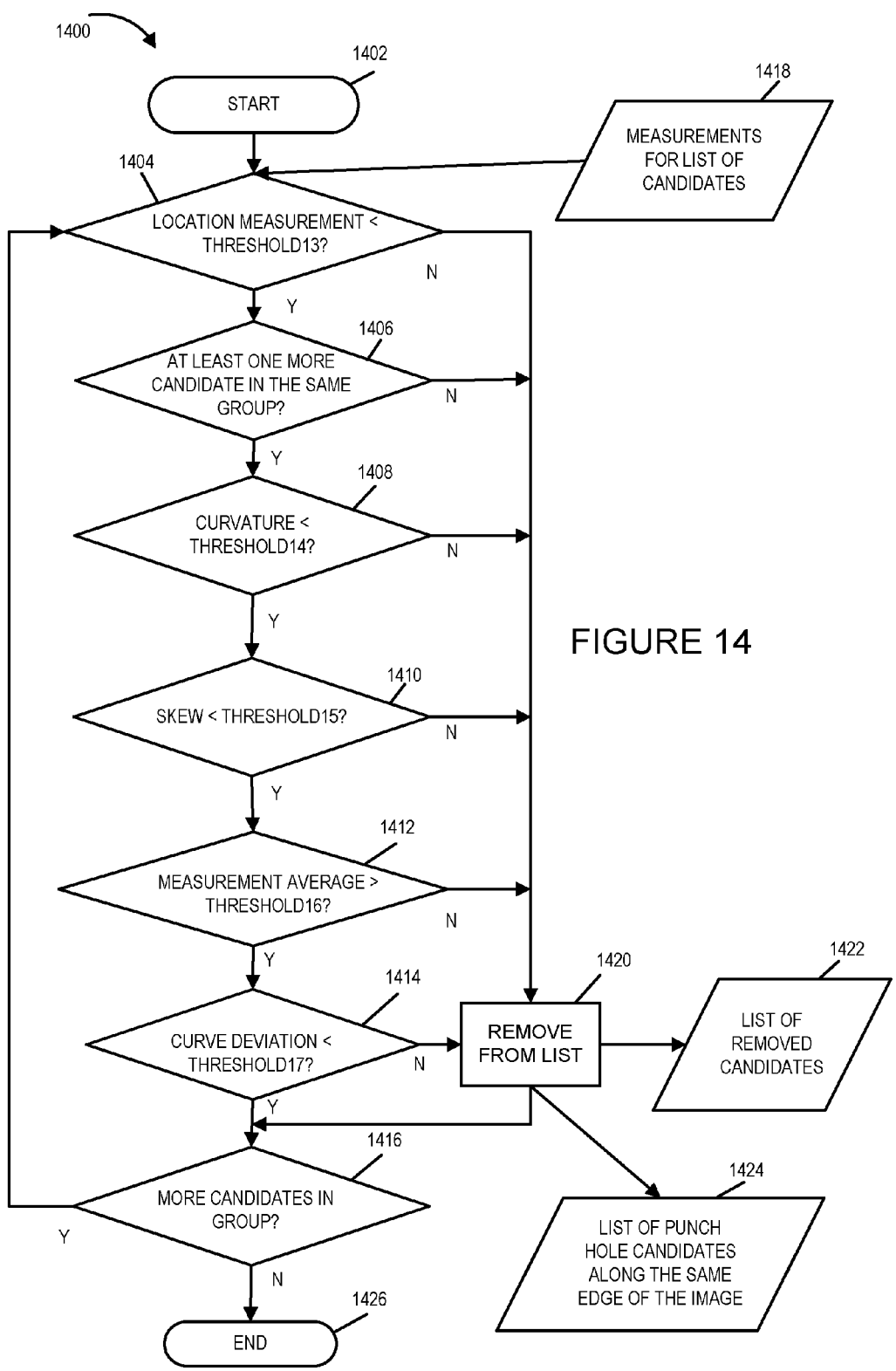
FIG. 14 illustrates an exemplary subroutine which is used to evaluate punch-hole candidates in accordance with one embodiment of the present invention.

FIG. 14 depicts an exemplary subroutine 1400 which may be and in some embodiments is used to implement step 416 of FIG. 4 of the present invention which performs additional evaluations on the punch-hole candidates and eliminates from a group of punch-hole candidates aligned to one edge of the image those candidates that based on a combination of the candidate's properties and the properties of the group it is associated with are determined to not be punch holes. Subroutine 1400 achieves this result by evaluating each potential punch-hole candidate in the group one at a time. The processing steps used to implement subroutine 1400 will now be discussed in further detail. The subroutine 1400 starts at start step 1402 with the subroutine 1400 being executed on processor 110 and proceeds to decision step 1404. At decision step 1404, processing of the properties associated with a potential punch-hole candidate, including the measurements for the list of punch-hole candidates, 1418 commences. In step 1404, the punch-hole candidate's location measurement is compared to a punch-hole location threshold value referred to as threshold 13. If the punch-hole candidate's location measurement is less than threshold 13 then the processing proceeds to decision step 1406; otherwise processing proceeds to remove from list step 1420. At decision step 1406, it is determined whether there exists at least one more punch-hole candidate in the same group as the punch-hole candidate under evaluation. If there is at least one more punch-hole candidate in the same group then processing proceeds to step 1408; otherwise processing proceeds to remove from list step 1420. At decision step 1408, the punch-hole candidate's curvature measurement is compared to a punch-hole curvature threshold referred to as threshold 14. If the punch-hole candidate's curvature threshold is less than threshold 14 then processing proceeds to decision step 1410 otherwise processing proceeds to remove from list step 1420. At decision step 1410, punch-hole candidate's skew measurement is compared to a punch-hole skew threshold referred to as threshold 15. If the punch-hole candidate's skew threshold is less than threshold 15 then processing proceeds to decision step 1412; otherwise processing proceeds to remove from list step 1420. At decision step 1412, the punch-hole candidate's measurement average is compared to a punch-hole measurement average threshold referred to as threshold 16. If the punch-hole candidate's measurement average is greater than threshold 16 then processing proceeds to remove from list step 1420 otherwise processing proceeds to decision step 1414. At decision step 1414, the punch-hole candidate's curve deviation measurement is compared to a punch-hole curve deviation threshold referred to as threshold 17. If the punch-hole candidate's curve deviation value is less than threshold 17 then processing proceeds to remove from list step 1420 otherwise processing proceeds to decision step 1416. At processing step 1420, the punch-hole candidate that failed to meet the criteria necessary to be a punch hole in subroutine 1400 is removed from the list of punch-hole candidates along the same edge of the image 1424 and added to a list of removed candidates 1422. The lists may then be saved in memory for future use in future processing steps of the present invention or other image processing enhancements. From step 1420 processing then proceeds to decision step 1416. At decision step 1416 it is determined whether there are additional punch-hole candidates that need to be evaluated. If there are additional punch-hole candidates that need to be evaluated then processing proceeds to step 1404 where the next punch-hole candidate's characteristics and measurements beings evaluated. If there are no additional punch-hole candidates to be evaluated then processing proceeds from decision step 1416 to end step 1426. At end step 1426, the processing of the portion of the method implemented by exemplary subroutine 1400 of the present invention is concluded.

In one exemplary embodiment the following weight constants and threshold values were used to implement the punch-hole identification and evaluation method of the present invention:
weight 1=1, weight 2=1, weight 3=2, weight 4=2, weight 5=1, weight 6=1, weight 7=1, weight 8=1, weight 9=4, weight 10=4, weight 11=1, threshold 1=image width in pixels/20, threshold 2=image height in pixels/20, threshold 3=80, threshold 4=98, threshold 5=42, threshold 6=2.0, threshold 7=threshold 4=98, threshold 8=65, threshold 9=65, threshold 10=50, threshold 11=50, threshold 12=50, threshold 13=80, threshold 14=0.01, threshold 15=0.1, threshold 16=80, and threshold 17=0.01. The count factor was set to 0, if the number of candidates in the group being evaluated was <2. The count factor was set to 100, if the number of candidates in the group being evaluated was =2 or 3. And, the count factor was set to 75, if the number of candidates in the group being evaluated was any number greater than 3.

In another exemplary embodiment of the image processing method of the present invention, the method comprises the steps of receiving image data representing a plurality of components corresponding to an image; performing punch-hole component checks on one or more components, said punch-hole component checks including at least one component-level check, said component-level check including comparing a circularity value indicating circularity of a component on which the check is performed to a circularity threshold; and identifying image components which pass said punch-hole component checks as punch holes. In some embodiments the component circularity check is passed when the circularity value of the component is above said circularity threshold.

In some embodiments the punch-hole component checks further include: a second component-level check, said second component-level check including a density level check, said density level check including comparing a density measure of the component on which the density level check is performed to a density threshold. In some embodiments the density level check is passed if the density measure of the component is above said density threshold.

In some embodiments the method wherein said punch-hole component checks further include: a third component-level check. The third component-level check being a black pixel ratio check, said black pixel ratio check including comparing, to a black pixel ratio threshold, a black pixel ratio of: i) a total number of black pixels in the component to which the third component-level check is performed and ii) the total number of pixels in the component to which the third component-level check is performed. In some embodiments the black pixel ratio check is passed if said black pixel ratio exceeds said black pixel ratio threshold.

In some embodiments the method's punch-hole component checks may contain a fourth component-level check, said fourth component-level check including an aspect ratio check, said aspect ratio check including comparing an aspect ratio of the component on which the aspect ratio check is performed to an aspect ratio threshold. In some embodiments the aspect ratio check is passed if the aspect ratio of the component is below said aspect ratio threshold.

In some embodiments the method, wherein said punch-hole component checks further include: a fifth component-level check, said fifth component-level check including a first size check, said first size check including comparing a maximum vertical length of the component with a first size threshold. In some embodiments the method, wherein said first size check is passed if the maximum vertical length of the component is below said first size threshold.

In some embodiments the method, wherein said punch-hole component checks further include: a sixth component-level check, said sixth component-level check including a second size check, said second size check including comparing a maximum horizontal length of the component with a second size threshold. In some embodiments of the method said second size check is passed if the maximum horizontal length of the component is above said second size threshold.

In some embodiments of the image processing method of the present invention, the method comprises the steps of receiving image data representing a plurality of components corresponding to an image; performing punch-hole component checks on one or more components, said punch-hole component checks including at least one component-level check, said component-level check including comparing a circularity value indicating circularity of a component on which the check is performed to a circularity threshold; and identifying image components which pass said punch-hole component checks as punch holes and said punch-hole component checks further include performing a first group-level punch-hole component check. In some embodiments the method is implemented wherein performing the first group-level punch-hole component check includes: determining if the component on which the first group-level punch-hole component check is performed has a shape measurement within a threshold amount of a corresponding group shape measurement. In some embodiments the method is implemented wherein performing the first group-level punch-hole component check includes: determining a curve that minimizes the sum of the squared distances of each component in the group to the curve; determining if the location of the component, on which the first group-level punch-hole component check is performed, is within a threshold distance of the curve.

An exemplary method of performing the punch hole image identification and removal process which can be and in some embodiments of the present invention is used will now be discussed in connection with reference to FIG. 15. The method of exemplary routine 1500 starts at start step 1502 with the routine 1500 being executed by the processor 110. At this point the image data to be analyzed for identification and removal of punch holes has already been digitized through scanning or other methods. From start step 1502, operation proceeds to step 1504. In step 1504, the image data 1510, e.g., binary image data, corresponding to the image or image component in which punch holes are to be identified for removal or for other image processing operations begins being processed. While binary image data is processed in the exemplary embodiment, the methods and apparatus of the invention can be used with other types of image data as well e.g., with gray scale and/or color images. Step 1504 processes the image data representing a plurality of components 1510 to determine each component's characteristics. Exemplary component characteristics which may be and in some embodiments are determined include a component's circularity, density, black pixel ratio, aspect ratio, maximum vertical length, and maximum horizontal length. This data may then be stored in memory 108 for later use in the punch-hole identification and removal method or for other image enhancement processing operations. Step 1504 may also have been performed in advance and each component's characteristic data may already be available for use in connection with the punch-hole identification and removal method of the present invention in which case step 1504 may be skipped.

Subroutine 1600 of FIG. 16 which will be discussed further below may be, and in some embodiments of the present invention is used to implement step 1504. After each component's characteristics have been determined processing proceeds to step 1506. At step 1506, one or more component-level checks are performed to identify the components which are punch holes in the image. In addition to component-level checks group-level checks may also be performed during the processing of step 1506. The component-level and group-level checks may be and in some embodiments are based on the image data representing a plurality of components 1510 and/or the component characteristic data determined in step 1504. Subroutine 1700 of FIG. 17 which will be discussed further below may be, and in some embodiments of the present invention is used to implement step 1506. In step 1506, a list of punch holes in the image 1512 is generated. The list of punch-hole images may be and in some embodiments is stored in memory 108 for later use in the punch-hole identification and removal method or for other image processing enhancement operations or statistical data collection. The list of punch holes on the image may be stored with image data 1510 or separately from the image data.

Processing proceeds from step 1506 to step 1508 wherein the list of punch holes on the image data 1512 is used to remove the identified punch holes from the image. This can, and in some embodiments of the invention is achieved by replacing the foreground color pixel values associated with the pixels compromising the identified punch holes (e.g., black) with the pixel values of the background color of the image (e.g., white). Upon completion of the removal of the identified punch holes the method 1500 will end at step 1514 pending input of another image to be processed and repeating the method 1500.

Figure 15:
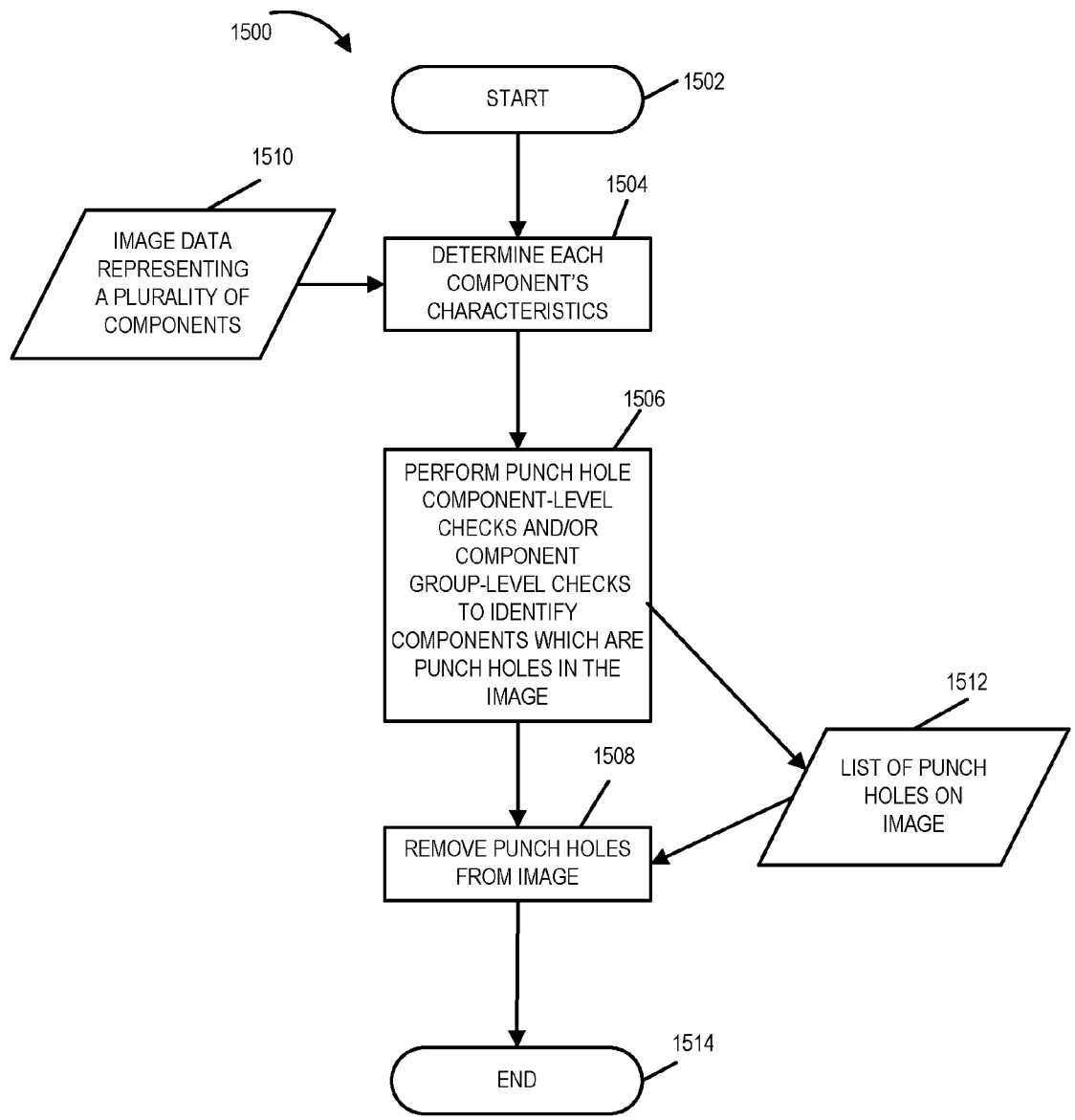
FIG. 15 illustrates an exemplary method of performing the punch-hole image identification and removal process which is used in accordance with one embodiment of the present invention.
Figure 16:
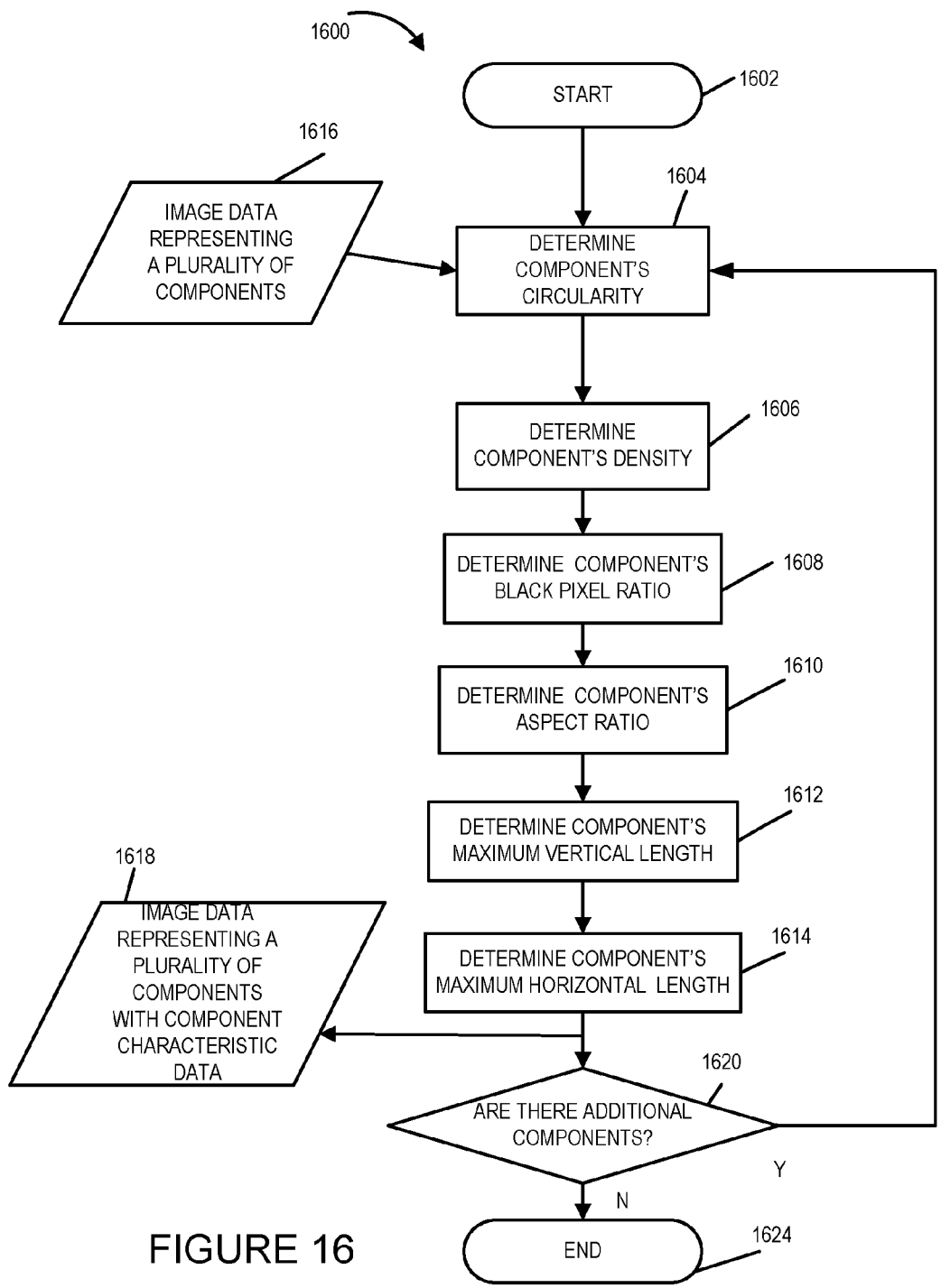
FIG. 16 illustrates an exemplary subroutine which is used in determining a component's characteristics in accordance with one embodiment of the present invention.

FIG. 16 depicts an exemplary subroutine 1600 which may be and in some embodiments of the present invention is used for implementing step 1504 of FIG. 15 which determines each component's characteristics. The component characteristics determined by subroutine 1600 are exemplary as additional or different characteristics may be determined depending on the component image data available and the component-level and group-level checks to be performed on the image data. The subroutine 1600 starts at start step 1602 with subroutine 1600 being executed on processor 110 and proceeds to step 1604. At each of the processing steps of subroutine 1600 the image data representing a plurality of components may be and in some embodiments of the present invention is used to calculate the various component characteristics. At step 1604, image data associated with a first component from the image data representing a plurality of components 1616 is used to determine a component's circularity. Processing then proceeds to step 1606 wherein image data 1616 is used to determine the component's density. Processing then proceeds to step 1608 wherein the component's black pixel ratio which is the ratio of i) a total number of black pixels in the component, and ii) the total number of pixels in the component is determined. Processing then proceeds from step 1608 to step 1610 where the component's aspect ratio is determined. Processing then proceeds to step 1612 wherein the component's maximum vertical length is determined. The component's maximum vertical length may be and in some embodiments of the present invention is calculated by adding up the number of pixels in one column of the bounding box representing the component image being analyzed. Processing then proceeds to step 1614 where the component's maximum horizontal length is determined. The component's maximum horizontal length may be and in some embodiments of the present invention is calculated by adding up the number of pixels in one row of the bounding box representing the component image being analyzed. The component image data including component characteristics 1618 may be stored in memory 108 for later use in the punch-hole identification method or for other image enhancement processing operations. The data may also be stored with or associated with image data 1616. From step 1614 processing proceeds to step 1620 where it is determined if there are additional components whose characteristics need to be determined. If there are additional components then processing proceeds to step 1604 where the process is repeated. This process is repeated until all components have been processed and it is determined that there are no additional components to be processed at step 1620 wherein processing proceeds to end step 1624. At step 1624, the processing associated with this portion of the method ends as the subroutine completes and processing continues with other portions of the method.

Figure 17:
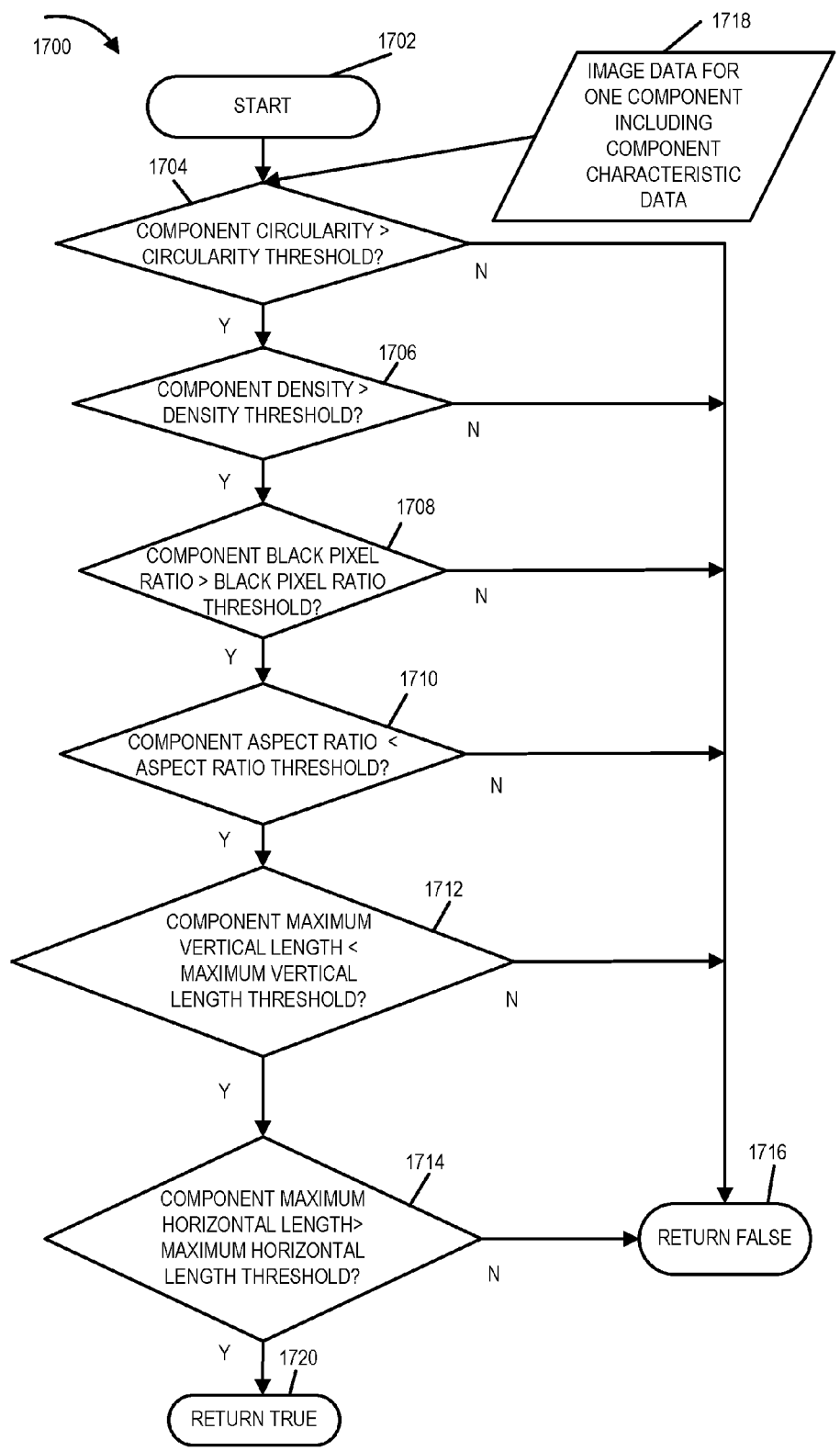
FIG. 17 illustrates an exemplary subroutine which is used to perform component-level checks to determine if a component is a punch hole in accordance with one embodiment of the present invention.

FIG. 17 depicts an exemplary subroutine 1700 which may be and in some embodiments of the present invention is used for implementing step 1506 of FIG. 15 which performs component-level checks to determine if a component is a punch hole. The component-level checks performed by subroutine 1700 are exemplary as some, all, additional, or different component-level checks may be used to determine if the component is a punch hole on the image. Additionally group-level checks may also be used to determine if a component is a punch hole on the image. Subroutine 1700 starts at start step 1702 with subroutine 1700 being executed on processor 110 and proceeds to decision step 1704. At each of the processing steps of subroutine 1700 the image data for one component including component characteristic data 1718 may be and in some embodiments of the present invention is used in performing each of the component checks at decision steps 1704, 1706, 1708, 1710, 1712, and 1714. At decision step 1704, a circularity punch-hole component-level check is performed by comparing the component's circularity value which indicates the circularity of the component on which the check is being performed to a circularity threshold. If the component's circularity value is less than or equal to the circularity threshold value then the component is determined to have failed the punch-hole component circularity check and processing proceeds to return step 1716. If the component's circularity value is greater than or above the circularity threshold value then the component's circularity check is passed. If the component passes the punch-hole circularity check, processing proceeds to decision step 1706. In some embodiments of the present invention, if the component passes the punch-hole component circularity check, the image component is identified as a punch hole and no further checks need be performed.

At decision step 1706, a second punch-hole component-level check is performed. The second punch-hole component-level check includes a density-level check wherein a density measure of the component on which the density-level check is performed is compared to a punch-hole density threshold. If the component's density level is less than or equal to the density threshold then processing proceeds to return step 1716. If the measured density level of the component is greater than or above the density threshold then the density level check is passed and processing proceeds to decision step 1708. In some embodiments of the present invention, if the component passes the punch-hole component circularity check and density check the image component is identified as a punch hole and no further checks need be performed.

At decision step 1708, a third punch-hole component-level check is performed. The third component-level check being a black pixel ratio check which includes comparing to a punch-hole black pixel ratio threshold, a black pixel ratio of: i) the total number of black pixels in the component to which the third component-level check is being performed and ii) the total number of pixels in the component to which the third component-level check is being performed. If the component's black pixel ratio is equal to or less than the black pixel ratio threshold then the punch-hole black pixel ratio check is failed and processing proceeds to return step 1716. If the component's black pixel ratio exceeds the black pixel ratio threshold then the punch-hole black pixel ratio component check is passed and processing proceeds to decision step 1710. In some embodiments of the present invention, if the component passes the punch-hole component circularity check, density check, and the black pixel ratio check, the image component is identified as a punch hole and no further checks need be performed.

At decision step 1710, a fourth punch-hole component-level check is performed. The fourth component-level check being a punch-hole aspect ratio check which includes comparing the aspect ratio of the component on which the aspect ratio check is being performed to an aspect ratio threshold. If the aspect ratio of the component under evaluation is greater than or equal to the punch-hole aspect ratio threshold then the check is failed and processing proceeds to return step 1716. If the component's aspect ratio is less than or below the punch-hole aspect ratio threshold value then the punch-hole aspect ratio check is passed and processing proceeds to decision step 1712. In some embodiments of the present invention, if the component passes the punch-hole component circularity check, density check, black pixel ratio check, and aspect ratio check, the image component is identified as a punch hole and no further checks need be performed.

At decision step 1712, a fifth punch-hole component-level check is performed. The fifth component-level check being a first size check which includes comparing the maximum vertical length of the component with a first size threshold. If the maximum vertical length of the component under evaluation is greater than or equal to the first punch-hole size threshold then the check is failed and processing proceeds to return step 1716. If the component's maximum vertical length is less than or below the first punch-hole size threshold value then the first punch-hole size check is passed and processing proceeds to decision step 1714. In some embodiments of the present invention, if the component passes the punch-hole component circularity check, density check, the black pixel ratio check, aspect ratio check, and first size check the image component is identified as a punch hole and no further checks need be performed.

At decision step 1714, a sixth punch-hole component-level check is performed. The fifth component-level check being a second size check which includes comparing the maximum horizontal length of the component with a second size threshold. If the maximum horizontal length of the component under evaluation is less than or equal to the second punch-hole size threshold then the check is failed and processing proceeds to return step 1716. If the component's maximum horizontal length is greater than or above the second punch-hole size threshold value then the second punch-hole size check is passed and processing proceeds to decision return step 1720. At return step 1720 a "true" value is returned to the routine which called subroutine 1700 indicating that the image component under evaluation has passed the component-level checks. In some embodiments of the present invention the component is also identified as a punch hole at return step 1720 at which time this information is added to a list of punch holes on the image and/or stored in memory 108 with the image component data. At return step 1716, a "false" value is returned to the routine that called subroutine 1700 indicating that the component failed to pass the component-level checks. In some embodiments of the present invention this information is added to a list of components which are not punch holes on the image and/or stored in memory 108 with the image component data. Processing in connection with this portion of the method ceases when the return step 1716 or return step 1720 is completed executing.

Figure 18:
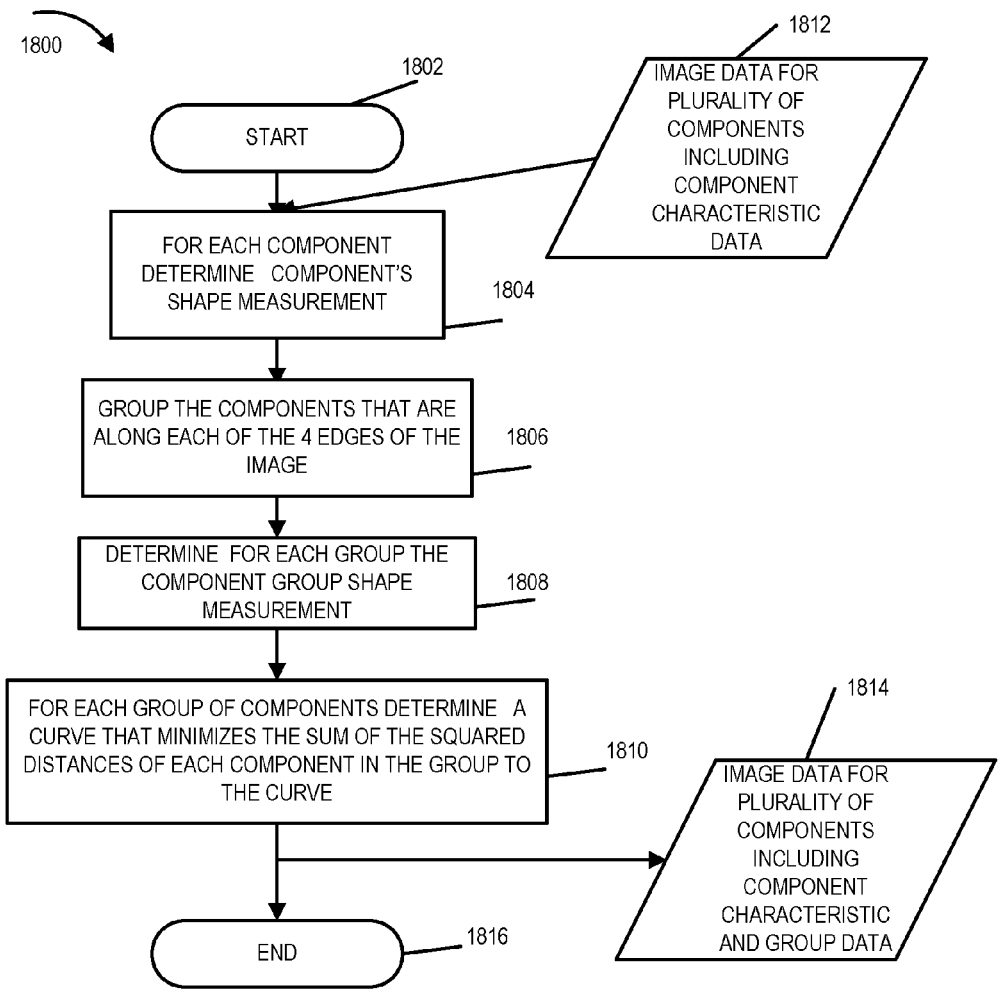
FIG. 18 illustrates an exemplary subroutine which is used in determining a component's characteristics and characteristics for an associated group of components in accordance with one embodiment of the present invention.
Figure 19:
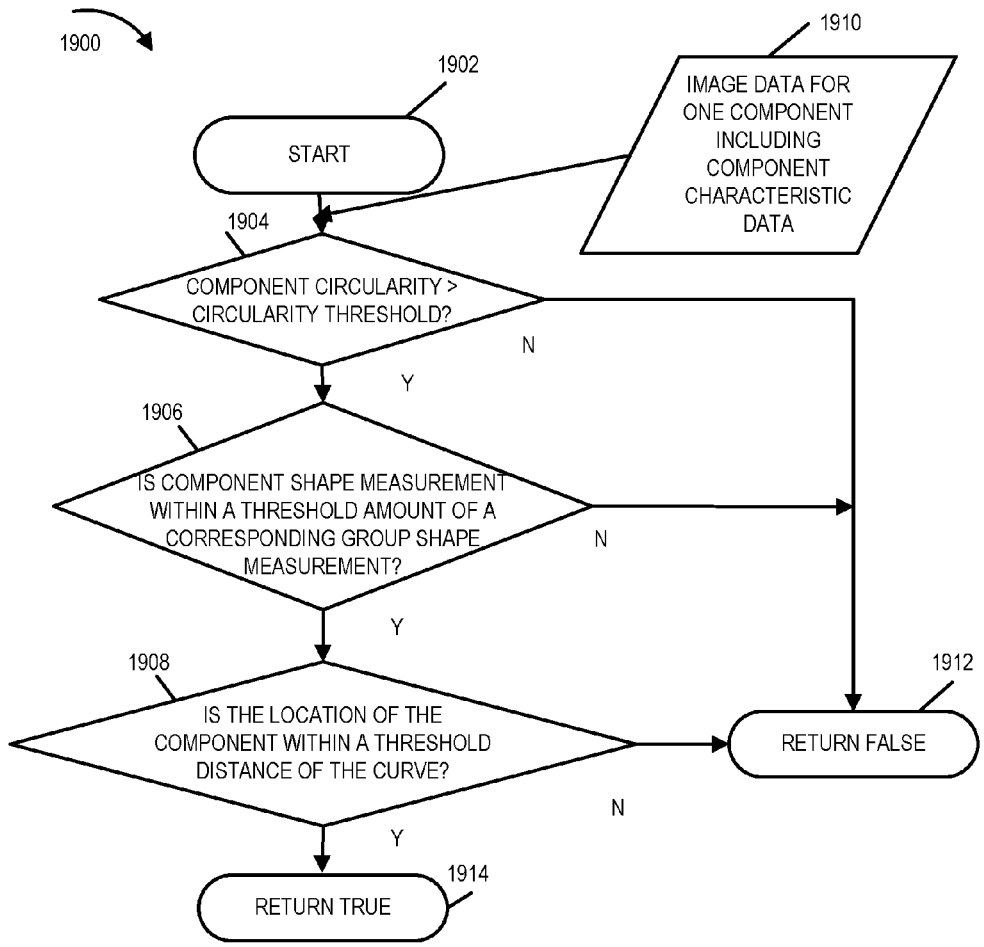
FIG. 19 illustrates an exemplary subroutine which is used in evaluating a component's characteristics and the characteristics for an associated group of components in accordance with one embodiment of the present invention.

As previously discussed, in some embodiments of the present invention in addition to performing one or more component-level checks on a component to determine if it is a punch hole, group-level punch-hole checking is performed in addition to the component-level checks to add an additional level of reliability. FIGS. 18 and 19 depict exemplary subroutines 1800 and 1900 which may be and are used in some embodiments of the present invention for implementing step 1506 of FIG. 15 which performs both component-level checks and group-level checks to determine if a component is a punch hole.

FIG. 18 depicts an exemplary subroutine 1800 which may be and in some embodiments of the present invention is used for implementing a portion of step 1506 of FIG. 15 which determines component characteristics and characteristics for an associated group of components. The component and group characteristics determined by subroutine 1800 are exemplary as additional or different characteristics may be determined depending on the component image data and group data available and the component-level and group-level checks to be performed on the image data. The subroutine 1800 starts at start step 1802 with subroutine 1800 being executed on processor 110 and proceeds to step 1804. At each of the processing steps of subroutine 1800 the image data representing a plurality of components may be and in some embodiments of the present invention is used to calculate the various component and group characteristics. At step 1804, image data associated with each component from the image data representing a plurality of components 1812 is used to determine each component's shape measurement. Processing then proceeds to step 1806 wherein the components that are along each of the 4 edges of the image (e.g., left edge, right edge, top edge and bottom edge) are placed into their corresponding edge group. Processing then proceeds to step 1808 wherein the group shape measurement is determined for each group. Processing then proceeds from step 1808 to step 1810 where for each group of components a curve that minimizes the sum of the squared distances of each component in the group to the curve is determined. The component image data including component characteristics and group data 1814 may be stored in memory 108 for later use in the punch-hole identification method or for other image enhancement processing operations. The data may also be stored with or associated with image data 1810. From step 1810 processing proceeds to end step 1816. At step 1816, the processing associated with this portion of the method ends as the subroutine 1812 completes and processing for other portions of the method such as processing associated with the component checks of subroutine 1900 are performed.

FIG. 19 depicts an exemplary subroutine 1900 which may be and in some embodiments of the present invention is used for implementing a portion of step 1506 of FIG. 15 which evaluates component's characteristics and characteristics for an associated group of components. The component-level and group-level checks performed by subroutine 1900 are exemplary as some, all, additional or different component-level and group-level checks may be used to determine if the component is a punch hole on the image. Subroutine 1900 starts at start step 1902 with subroutine 1900 being executed on processor 110 and proceeds to decision step 1904. At each of the processing steps of subroutine 1900 the image data for one component including component characteristic and group data 1910 may be and in some embodiments of the present invention is used in performing each of the component-level and group-level checks at decision steps 1904, 1906, and 1908. At decision step 1904, a circularity punch-hole component-level check is performed by comparing the component's circularity value which indicates the circularity of the component on which the check is being performed to a circularity threshold. If the component's circularity value is less than or equal to the circularity threshold value then the component is determined to have failed the punch-hole component circularity check and processing proceeds to return step 1912. If the component's circularity value is greater than or above the circularity threshold value then the component's circularity check is passed. If the component passes the punch-hole circularity check, processing proceeds to decision step 1906. In some embodiments of the present invention, if the component passes the punch-hole component circularity check, the image component is identified as a punch hole and no further checks need be performed.

At decision step 1906, a second punch-hole component check is performed which includes a first group-level punch-hole component check. The first group-level punch-hole component check determining if the component on which the first group-level punch-hole component check is performed has a shape measurement within a threshold amount of a corresponding group shape measurement. If the component's shape measurement is not within a threshold amount of a corresponding group shape measurement then the shape measurement group check fails and processing proceeds to return step 1912. If the component's shape measurement is within a threshold amount of a corresponding group shape measurement then the shape measurement group check is passed and processing proceeds to step 1908. In some embodiments of the present invention, if the component passes the punch-hole component circularity check and group shape measurement check the image component is identified as a punch hole and no further checks need be performed.

At decision step 1908, a second group-level punch-hole component check is performed which includes determining if the location of the component, on which the second group-level punch-hole component check is performed, is within a threshold distance of the curve that minimizes the sum of the squared distances of each component in the group to the curve. If the component is not located within the threshold distance of the curve then the location group-level check is not passed and processing proceeds to return step 1912. If the component's location is within the threshold distance then the location group-level check is passed and processing proceeds to return step 1914. In some embodiments of the present invention additional group-level checks are performed to provide additional reliability that the component is a punch hole.

Figures 25, 25A:
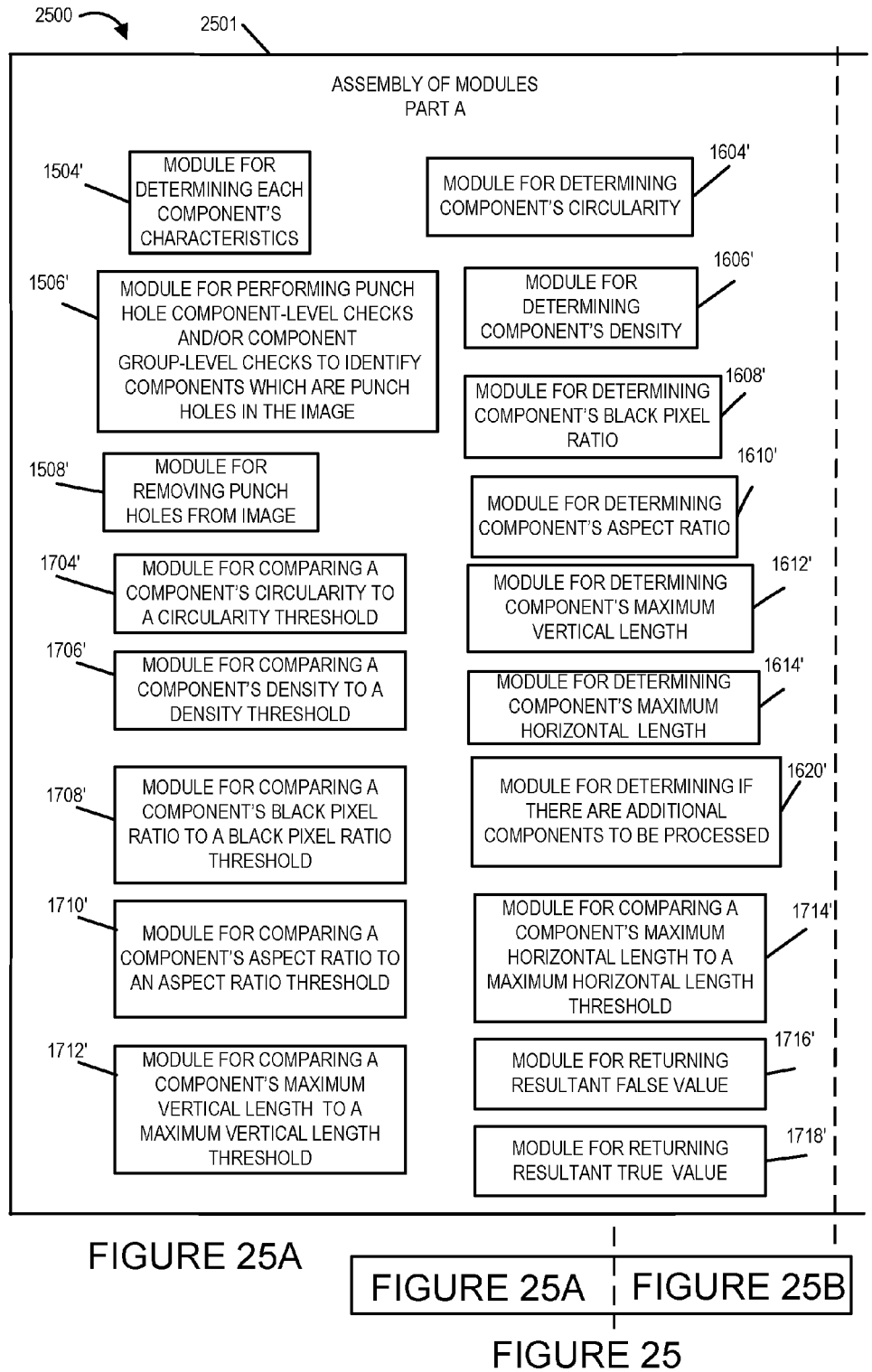
FIG. 25 illustrates an exemplary assembly of modules for performing various functions of the punch-hole image identification and removal process in accordance with one embodiment of the present invention.
Figure 25B:
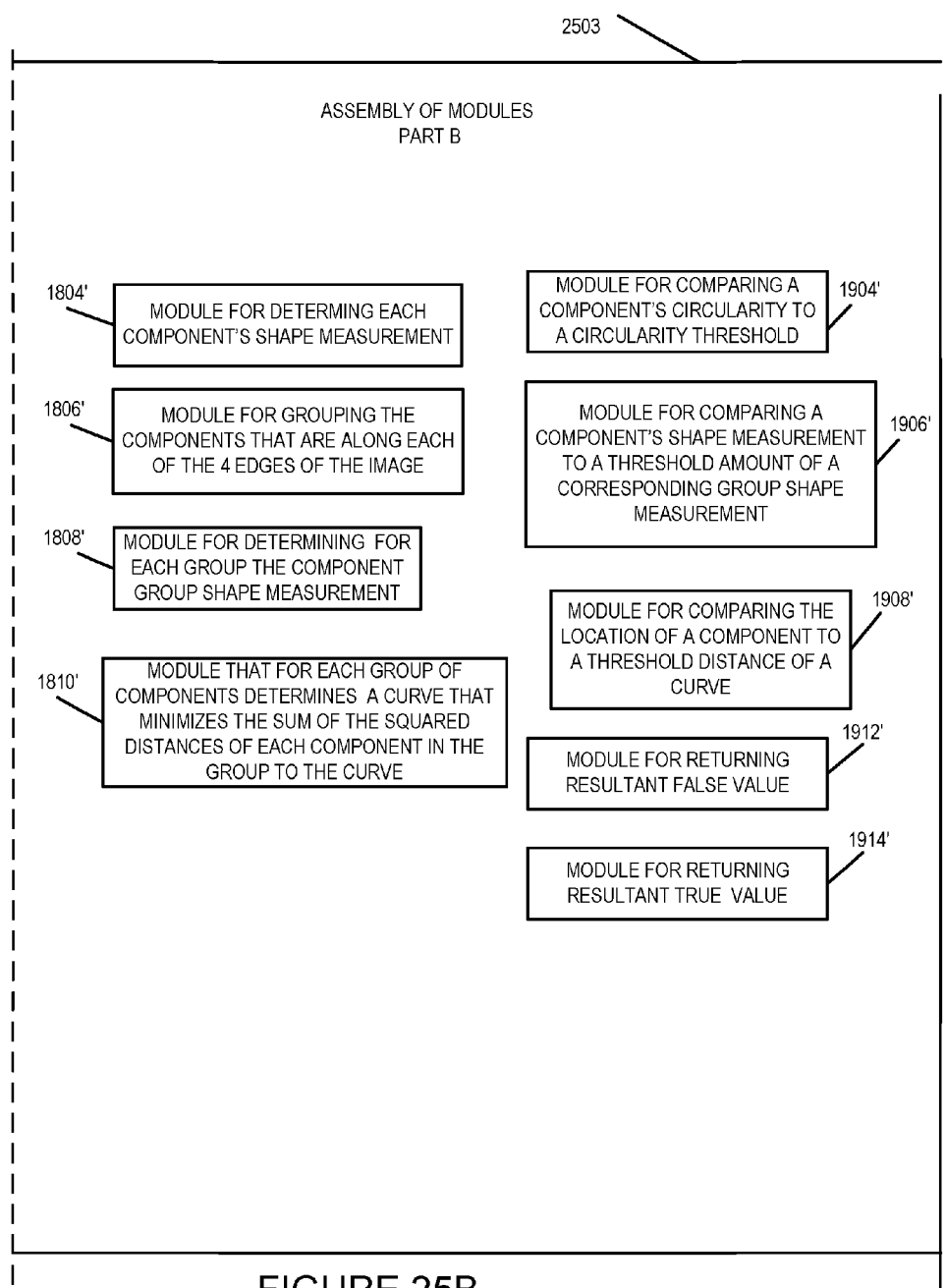

Various functions of the present invention may be and are implemented as modules in some embodiments. The assembly of modules 2500 shown in FIG. 25 illustrates an exemplary assembly of modules, e.g., software or hardware modules, that may be and are used for performing various functions of the punch-hole image identification and removal process in some embodiments of the present invention. FIG. 25 consists of FIG. 25A and FIG. 25B. The assembly of modules 2500 includes the assembly of modules part A 2501 shown in FIG. 25A and the assembly of modules part B 2503 shown in FIG. 25B. When the modules identified in FIG. 25 are implemented as software modules they may be, and in some embodiments of the present invention are, stored in memory 108 of FIG. 1 in the section of memory identified as assembly of modules 118. These modules may be implemented instead as hardware modules, e.g., circuits. Each of the modules identified in FIG. 25 has been numbered as the prime of the subroutine and/or step of the corresponding method disclosed. For example, module 1504' corresponds to processing step 1504 of FIG. 15 which processes the image data to determine each component's characteristics. The description of the operation performed by the correspondingly numbered processing step is also applicable to describe the function performed by the correspondingly numbered module.

Figure 26:
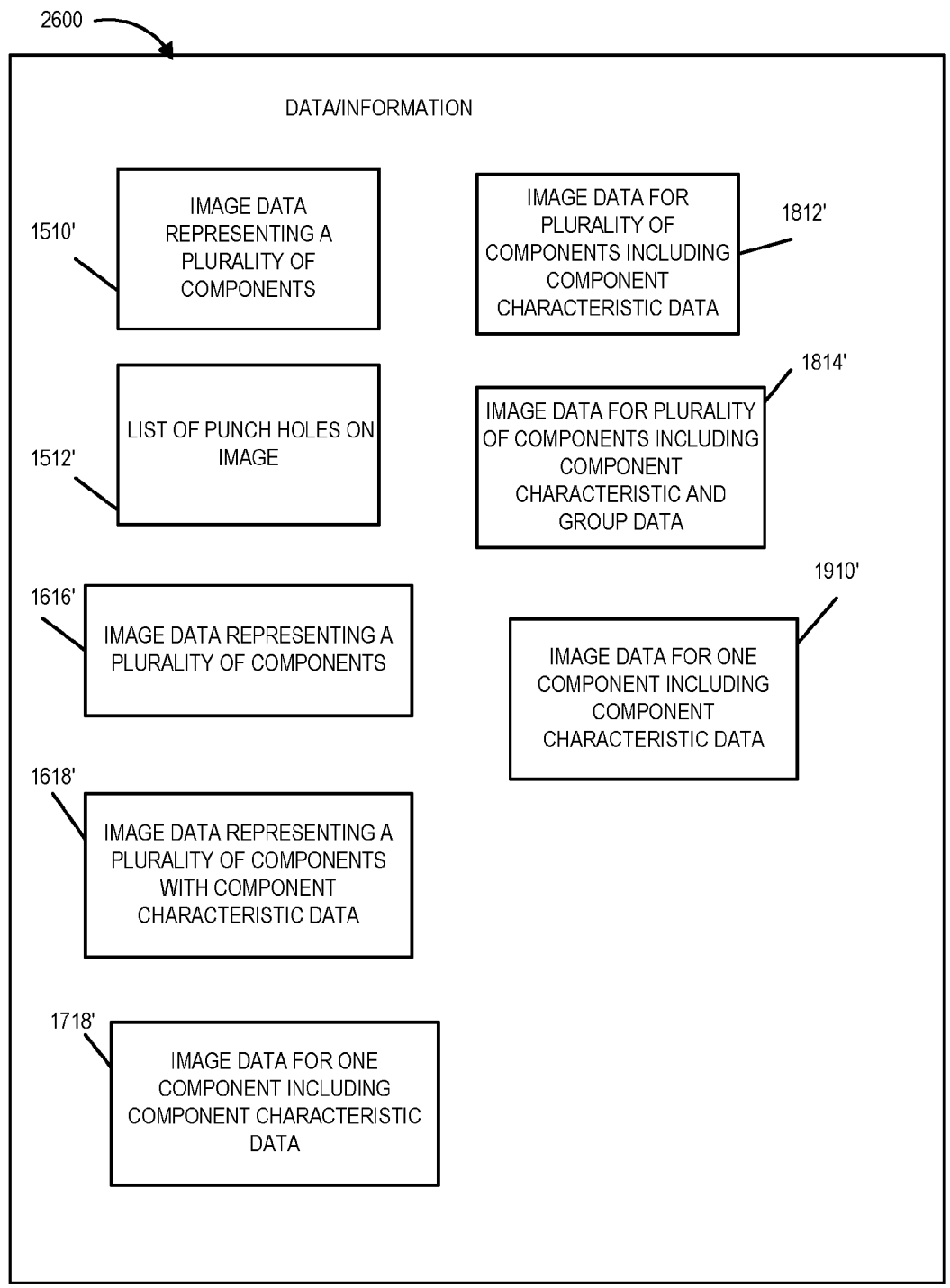
FIG. 26 illustrates exemplary data/information that is used and stored in memory in connection with the punch-hole image identification and removal process in accordance with one embodiment of the present invention.

Data/information 2600 of FIG. 26 is exemplary data/information that may be and in some embodiments is used and/or stored in memory in connection with the punch-hole image identification and removal process of the present invention. The data/information 2600 may be, and in some embodiments is, stored in the data/information 120 section of memory 108 of FIG. 1. Data/information 2600 contains the following exemplary data/information elements: image data representing a plurality of components 1510', list of punch holes 1512', image data representing a plurality of components 1616', image data representing a plurality of components with component characteristic data 1618', image data for one component including component characteristic data 1718', image data for plurality of components including component characteristic data 1812', image data for plurality of components including component characteristic and group data 1814' and image data for one component including component characteristic data 1910'. The data/information elements are numbered as the prime of the corresponding data/information used in the processing steps of the disclosed embodiments of the exemplary methods of the present invention. For example, the image data representing a plurality of components 1510' corresponds to the image data representing a plurality of components 1510 shown and discussed in connection with FIG. 15.

While a logical sequencing of the processing steps of the exemplary embodiments of the methods, routines and subroutines of the present invention have been shown, the sequencing is only exemplary and the ordering of the steps may be varied.

The techniques of various embodiments may be implemented using software, hardware and/or a combination of software and hardware. Various embodiments are directed to apparatus, e.g., an image data processing system. Various embodiments are also directed to methods, e.g., a method of processing image data. Various embodiments are also directed to machine, e.g., computer, readable medium, e.g., ROM, RAM, CDs, hard discs, etc., which include machine readable instructions for controlling a machine to implement one or more steps of a method.

Various features of the present invention are implemented using modules. For example each of the various routines and/or subroutines disclosed may be implemented in one or more modules. Such modules may be, and in some embodiments are, implemented as software modules. In other embodiments the modules are implemented in hardware. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine readable medium including machine executable instructions for causing a machine, e.g., processor and associated hardware, to perform one or more of the steps of the above described method(s).

Numerous additional variations on the methods and apparatus of the various embodiments described above will be apparent to those skilled in the art in view of the above description. Such variations are to be considered within the scope of the invention.

What is claimed is:

1. An image processing method, the method comprising:
operating a processor to receive image data representing a plurality of components corresponding to an image;
operating the processor to perform punch-hole component checks on one or more components, said punch-hole component checks including at least:
a first component-level check, said first component-level check including comparing a circularity value indicating circularity of a component on which the check is performed to a circularity threshold, and
a second component-level check, said second component-level check including a density level check, said density level check including comparing a density measure of the component on which the density level check is performed to a density threshold; and
operating the processor to identify image components which pass said punch-hole component checks as punch holes.

2. The method of claim 1, wherein said density level check is passed if the density measure of the component is above said density threshold.

3. The method of claim 1, wherein said punch-hole component checks further include:
a third component-level check, said third component-level check being a black pixel ratio check, said black pixel ratio check including comparing, to a black pixel ratio threshold, a black pixel ratio of: i) a total number of black pixels in the component to which the third component-level check is performed and ii) the total number of pixels in the component to which the third component-level check is performed.

4. The method of claim 3, wherein said black pixel ratio check is passed if said black pixel ratio exceeds said black pixel ratio threshold.

5. An image processing method, the method comprising:
operating a processor to receive image data representing a plurality of components corresponding to an image;
operating the processor to perform punch-hole component checks on one or more components, said punch-hole component checks including at least:
a first component-level check, said first component-level check including comparing a circularity value indicating circularity of a component on which the check is performed to a circularity threshold,
a second component-level check, said second component-level check including a density level check, said density level check including comparing density measure of the component on which the density level check is performed to a density threshold;
a third component-level check, said third component-level check being a black pixel ratio check, said black pixel ratio check including comparing, to a black pixel ratio threshold, a black pixel ratio of: i) a total number of black pixels in the component to which the third component-level check is performed and ii) the total number of pixels in the component to which the third component-level check is performed, and
a fourth component-level check, said fourth component-level check including an aspect ratio check, said aspect ratio check including comparing an aspect ratio of the component on which the aspect ratio check is performed to an aspect ratio threshold; and
operating the processor to identify image components which pass said punch-hole component checks as punch holes.

6. The method of claim 5, wherein said aspect ratio check is passed if the aspect ratio of the component is below said aspect ratio threshold.

7. The method of claim 5, wherein said punch-hole component checks further include:
a fifth component-level check, said fifth component-level check including a first size check, said first size check including comparing a maximum vertical length of the component with a first size threshold.

8. The method of claim 7, wherein said first size check is passed if the maximum vertical length of the component is below said first size threshold.

9. The method of claim 7, wherein said punch-hole component checks further include:
a sixth component-level check, said sixth component-level check including a second size check, said second size check including comparing a maximum horizontal length of the component with a second size threshold.

10. The method of claim 9, wherein said second size check is passed if the maximum horizontal length of the component is above said second size threshold.

11. The method of claim 1, said punch-hole component checks further include:
performing a first group-level punch-hole component check.

12. The method of claim 11, wherein performing the first group-level punch-hole component check includes:
determining if the component on which the first group-level punch-hole component check is performed has a shape measurement within a threshold amount of a corresponding group shape measurement.

13. The method of claim 11, wherein performing the first group-level punch-hole component check includes:

determining a curve that minimizes the sum of the squared distances of each component in the group to the curve;

determining if the location of the component, on which the first group-level punch-hole component check is performed, is within a threshold distance of the curve.

14. A non-transitory computer readable medium having machine executable instructions stored thereon for controlling a processor to process data representing an image, the non-transitory computer readable medium including:

code for controlling the processor to receive image data representing a plurality of components corresponding to the image;

code for controlling the processor to perform punch-hole component checks on one or more components, said punch-hole component checks including at least a first component-level check that includes comparing a circularity value indicating circularity of a component on which the check is performed to a circularity threshold and a second component-level check that includes an aspect ratio check, said aspect ratio check including comparing an aspect ratio of the component on which the aspect ratio check is performed to an aspect ratio threshold; and code for controlling the processor to identify image components which pass said punch-hole component checks as punch holes.

15. The non-transitory computer readable medium of claim 14, wherein said circularity check is passed if the circularity value of the component is above said circularity threshold.

16. The non-transitory computer readable medium of claim 14, wherein said code for controlling a processor to perform punch-hole component checks includes:

code for controlling said processor to perform a third component-level check, said third component-level check including a density level check, said density level check including comparing a density measure of the component on which the density level check is performed to a density threshold.

17. An image processing system, comprising:

a processor configured to:

receive image data representing a plurality of components corresponding to an image;

perform punch-hole component checks on one or more components, said punch-hole component checks including at least a first component-level check that includes comparing a circularity value indicating circularity of a component on which the check is performed to a circularity threshold and a second component-level check that includes an aspect ratio check, said aspect ratio check including comparing an aspect ratio of the component on which the aspect ratio check is performed to an aspect ratio threshold; and identify image components which pass said punch-hole component checks as punch holes; and a memory coupled to said processor.

18. The image processing system of claim 17, wherein said processor is further configured to:

perform a third component-level check, said third component-level check including a density level check, said density level check including comparing a density measure of the component on which the density level check is performed to a density threshold.

19. The method of claim 1, wherein said density measure is based on a ratio of a number of black pixels to a total number of pixels.

20. The method of claim 19 wherein said total number of pixels includes both black and white pixels in said component.

* * * * *